United States Patent [19]

Sakata

[11] Patent Number: 4,729,640
[45] Date of Patent: Mar. 8, 1988

[54] LIQUID CRYSTAL LIGHT MODULATION DEVICE

[75] Inventor: Hajime Sakata, Tokyo, Japan

[73] Assignee: Canon Kabushiki Kaisha, Tokyo, Japan

[21] Appl. No.: 782,558

[22] Filed: Oct. 1, 1985

[30] Foreign Application Priority Data

| Oct. 3, 1984 | [JP] | Japan | 59-207742 |
| Oct. 4, 1984 | [JP] | Japan | 59-209256 |
| Oct. 4, 1984 | [JP] | Japan | 59-209257 |
| Oct. 4, 1984 | [JP] | Japan | 59-209258 |
| Oct. 4, 1984 | [JP] | Japan | 59-209259 |
| Oct. 4, 1984 | [JP] | Japan | 59-209260 |
| Dec. 5, 1984 | [JP] | Japan | 59-256890 |
| Dec. 7, 1984 | [JP] | Japan | 59-258571 |
| Jan. 23, 1985 | [JP] | Japan | 60-10502 |
| Jan. 23, 1985 | [JP] | Japan | 60-10503 |

[51] Int. Cl.$^4$ .................... G02F 1/13; G02B 5/18
[52] U.S. Cl. .................... 350/348; 350/162.2; 350/162.21; 350/162.22; 350/347 V; 350/347 E
[58] Field of Search .......... 350/162.19, 162.2, 162.21, 350/162.22, 345, 347 E, 347 V, 348, 351

[56] References Cited

U.S. PATENT DOCUMENTS

| 3,530,010 | 9/1970 | Blakely | 350/162.22 |
| 3,980,396 | 9/1976 | Pollack et al. | 350/348 |
| 4,017,157 | 4/1977 | Van Riet | 350/345 |
| 4,057,326 | 11/1977 | Knop | 350/162.19 |
| 4,178,611 | 12/1979 | Okano | 350/162.2 |
| 4,227,769 | 10/1980 | Phillips et al. | 350/162.22 |
| 4,251,137 | 2/1981 | Knop et al. | 350/347 V |
| 4,405,405 | 9/1983 | Fujii et al. | 350/162.21 |
| 4,444,469 | 4/1984 | Kaye | 350/347 E |
| 4,472,026 | 9/1984 | Boyd et al. | 350/351 |
| 4,582,396 | 4/1986 | Bos et al. | 350/347 E |

*Primary Examiner*—John K. Corbin
*Assistant Examiner*—Martin Lerner
*Attorney, Agent, or Firm*—Fitzpatrick, Cella, Harper & Scinto

[57] ABSTRACT

A liquid crystal light modulation device comprises a pair of substrates at least one of which is transparent, a diffraction grating formed between or on at least one of the substrates, a liquid crystal arranged between fine grooves of the diffraction grating, and control means for changing the orientation of the liquid crystal which has been oriented in a predetermined state by the grooves of the diffraction grating.

36 Claims, 85 Drawing Figures

Fig.11A
Fig.11B
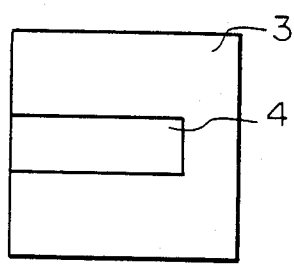
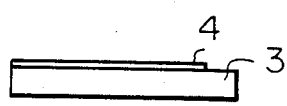
Fig.11C
Fig.11D
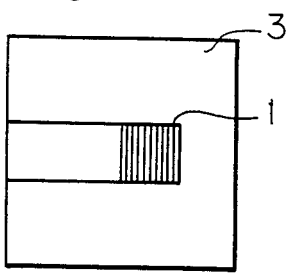
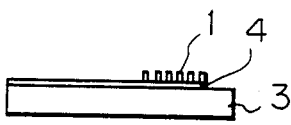
Fig.11E
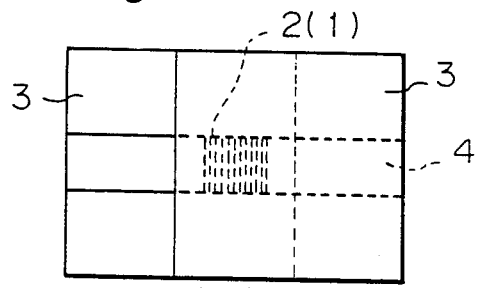
Fig.11F
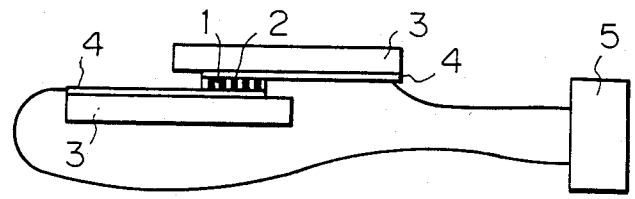

LIQUID CRYSTAL LIGHT MODULATION DEVICE

BACKGROUND OF THE INVENTION

1. Field of the Invention

The present invention relates to a light modulation device suitable for optical display, light coupling, optical recording and light communication, and more particularly to a liquid crystal light modulation device which modulates a light by controlling the refraction index relative to the incident light by changing the orientation of a liquid crystal.

2. Description of the Prior Art

In a known light modulation device which uses a liquid crystal, a liquid crystal (Nematic liquid) crystal having a position dielectricity) is filled between orthogonally oriented transparent electrodes and the liquid crystal is helically arranged to form a TN (Twisted Nematic) cell. This device is inserted between two polarization plates having orthogonal polarization directions to each other so that in a static state, having no electric field applied between the transparent electrodes, a light flux transmits through the orthogonal polarization plates, and in a state in which an electric field higher than a threshold is applied between the transparent electrodes the liquid crystal is oriented in the direction of the electric field (normal to the planes of the transparent electrodes) and the light flux is blocked by the exit polarization plate and is not transmit therethrough. In another device, transparent substrates having parallel electrodes are arranged such that the electrode planes face each other and a liquid crystal is filled between the electrodes to form a homogeneously oriented device. This device is usually used as a light switch. The orientation of the liquid crystal is changed by applying an electric field to change a refraction index, and a light flux is directed to the substrate plane of the device at a predetermined angle so that the incident light is totally reflected or totally transmitted at an interface between the liquid crystal and the electrode.

Japanese Examined Patent Publication No. 3928/1978 discloses a light modulation device in which a liquid crystal is filled between substrates having a diffraction grating of periodic unevenness formed on a side facing the liquid crystal of at least one of the substrates, and the orientation of the liquid crystal is controlled to change a refraction condition to an incident light to modulate the light. This device utilizes light interference at the diffraction grating and provides a clear color by hue modulation. It can achieve various modulations by utilizing waveform selectivity of the diffraction grating.

However, in the prior art light modulation devices using the liquid crystal, including the light modulation device disclosed in Japanese Examined Patent Publication No. 3928/1978, conventional rubbing or oblique evaporation of $SiO_2$ or $MgF_2$ is used to orient the liquid crystal. Therefore, the degree of orientation of the liquid crystal is small, response time is slow and temperature stability is low. In the TN cell, the response time cannot be improved because of the thickness of the cell, the light utilization efficiency is low because of the use of the polarization plates and the contrast ratio is low. Therefore, it does not provide a satisfactory performance for the display device.

SUMMARY OF THE INVENTION

It is an object of the present invention to provide a liquid crystal light modulation device having fast response time, high light flux utilization efficiency and stable function.

It is another object of the present invention to provide a liquid crystal light modulation device capable of modulating a light in various manners.

It is an other object of the present invention to provide a liquid crystal light modulation device which has a high contrast ratio and is free from harmful light.

In order to achieve the above objects, the liquid crystal light modulation device of the present invention is characterized by a diffraction grating inserted between or on at least one of substrates, at least one of which is transparent, a liquid crystal filled between fine grooves of the diffraction grating and oriented by the grooves, and control means for changing the orientation of the liquid crystal to modulate an incident light.

In the present invention, the liquid crystal is oriented by the fine grooves of the diffraction grating. Accordingly, the orientation of the liquid crystal is more regular than that obtained by the conventional rubbing process or oblique vapor deposition process. Thus, a highly ordered orientation is obtained. By changing the orientation of the liquid crystal by the control means, the refraction index of the liquid crystal to the incident light is changed so that a characteristic of a phase diffraction grating formed by the grooves and the liquid crystal between the grooves is changed and the incident light is modulated in various manners.

The construction and function of the device are determined by the shape of the diffraction grating formed between the substrates, that is, whether it is rectangular, triangular, sinusoidal or asymmetrical, the dimension of the diffraction grating such as the pitch of the grating, the depth of the grooves, the width of the grooves and the thickness of the liquid crystal layer, and the characteristics of the liquid crystal. In addition, various functions are determined by the control means for changing the orientation of the liquid crystal. The shape and dimension of the diffraction grating should be determined such that the liquid crystal is orderly oriented in the predetermined direction and functions as the diffraction grating. The diffraction grating may be selected from two types, a phase type diffraction grating and a reflection type diffraction grating.

BRIEF DESCRIPTION OF THE DRAWINGS

FIGS. 11A-11F illustrates formation of a liquid crystal light modulation device having characteristics shown in FIG. 10, FIGS. 12A and 12B illustrate shape conditions of a diffraction grating in a liquid crystal light modulation device having a flat spectro-transmittance characteristic.

DETAILED DESCRIPTION OF THE PREFERRED EMBODIMENTS

Figure 1A:
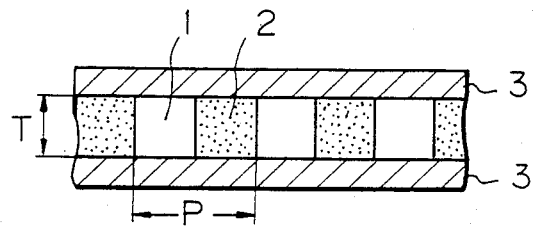
FIGS. 1A-1C show a basic construction of a liquid crystal light modulation device of the present invention.
Figure 1B:
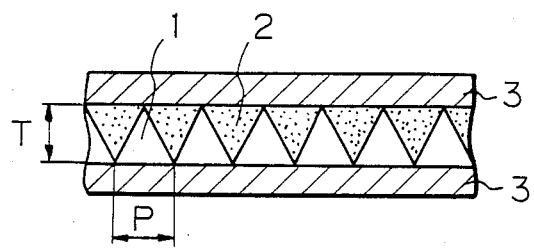
Figure 1C:
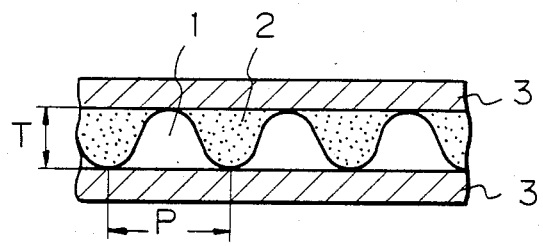

FIG. 1 shows a basic construction of a liquid crystal light modulation device of the present invention. Numeral 1 denotes a transparent insulator, numeral 2 denotes a liquid crystal, and numeral 3 denotes a transparent substrate. The liquid crystal light modulation device shown in FIG. 1A comprises transparent substrates 3 disposed to face each other, and transparent insulators 1 and liquid crystals 2 alternately arranged in a space between the transparent substrates 3 to form a diffraction grating. This is a most basic construction of the liquid crystal light modulation device. In FIG. 1B, the transparent insulators 1 are triangular, and in FIG. 1C, the transparent insulators 1 are sinusodial.

The liquid crystals in FIGS. 1A-1C are oriented in the direction of grooves of the diffraction gratings (normal to the plane of the drawing), and the orientation of the liquid crystal is changed by means (not shown) for controlling the orientation of the liquid crystal, for example, electric field, magnetic field or heat. When the electric field is used, electrode films are arranged on the transparent substrates 3 of the device shown in FIG. 1, or an electrode film is arranged on one of the transparent substrates 3 and another electrode film is arranged on the transparent insulator 1, and lead wires bonded to the electrode films are connected to a power supply.

T and P in FIG. 1 denote a thickness (T) and a pitch (P) of the diffraction grating formed in the device. They are in order of $\mu$m. The diffraction grating used in the present invention must have a function to diffract an incident light as well as a function to orient the liquid crystal, and it should meet the following condition.

In general, the diffraction of the liquid flux modulated by the diffraction grating for a given incident angle strongly depends on a wavelength of the light flux. The present liquid crystal light modulation device is applicable to a light of any wavelength whether it is a monochromatic light or a white light. Let us assume that it is used for a display or a light switch and has a wavelength $\lambda_o$ of $350 \leq \lambda_o \leq 800$ nm. A parameter $\Delta n \cdot T$ is defined to indicate a characteristic of the diffraction grating, where $\Delta n$ is a difference between an ordinary refraction index $n_e$ of the liquid crystal and an extraordinary refraction index $n_o$, and T is a height of the diffraction grating. In order to effectively modulate the light having the wavelength in the above range, it is necessary that $0.2 \leq \Delta n \cdot T \leq 1$ $\mu$m when the grating is rectangular and $1.3 \leq \Delta n \cdot T \leq 7.0$ $\mu$m when the grating is triangular. When the grating is sinusodial or trapezoidal, the condition is between those for the rectangular and the triangular. If the shape is not specified, the condition for the diffraction grating is $0.2 \leq \Delta_n \cdot T \leq 7.0$ μm. Within this range, the liquid crystal is sufficiently oriented. For example, when the liquid crystal has $\Delta n = 0.3$, the height T of the diffraction grating is $0.7 \leq T \leq 22$ μm.

The pitch P of the grating, which is another parameter to characterize the diffraction grating, strongly influences the orientation of the liquid crystal as the height T does. In order to fully orient the liquid crystal by the diffraction grating (specifically, planes forming the recesses of the grating), the upper limit of the pitch P is 10 μm and the lower limit is as much as the wavelength used in order to assume a normal diffraction. Thus, the pitch P is $\lambda_o \leq P \leq 10$ μm. If the range of the wavelength is $350 \leq \lambda_o \leq 800$ nm, the pitch P must meet $0.8 \leq P \leq 10$ μm.

When the present liquid crystal light modulation device is used for a light switch to control transmission and shut-off of a 0-order diffraction light, a separation angle to a high-order diffraction light such as ±1-order diffraction light is critical. Since the highest order of the diffraction light created by the diffraction grating depends only on the wavelength $\lambda_o$ of the incident light and the pitch P of the grating, it is possible to produce only the 0-order and ±1-order lights or only the 0-order light for the normal angle incident light by controlling the pitch in accordance with the incident light. The pitch should be variable only within the range for the condition of the orientation. When the present liquid crystal light modulation device is used as a single light switch, a light shield having an aperture is used, when it is used as a one-dimensional array, a light shield having a slit is used, and when it is used as a two-dimensional array for display, means for matching input/output stages is used in order to resolve the problem caused by the high-order diffraction light.

The construction of the diffraction grating in the present device are determined based on the above conditions, problems encountered during the formation and specifications of the present device and an apparatus in which the present device is incorporated. FIG. 1 and the following embodiments shows the liquid crystal light modulation device formed under those conditions and applications thereof.

FIG. 2 shows another basic construction of the liquid crystal light modulation device of the present invention. The numerals in FIG. 2 denote like elements shown in FIG. 1.

Figure 2A:
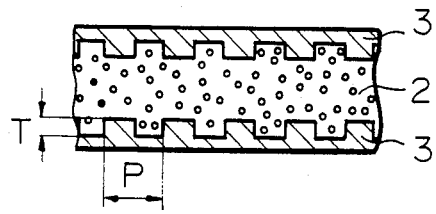
FIGS. 2A-2D show another construction of the liquid crystal light modulation device of the present invention.
Figure 2B:
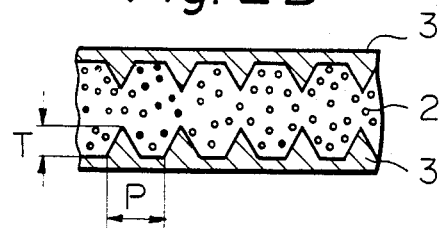
Figure 2C:
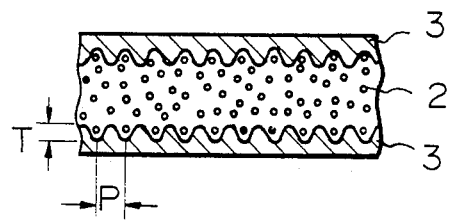
Figure 2D:
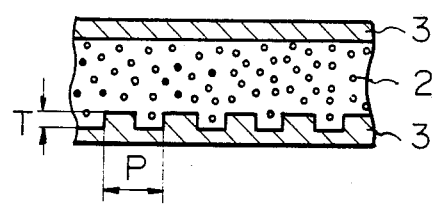

In the liquid crystal light modulation device shown in FIG. 2A, a diffraction grating having regularly arranged rectangular grooves is formed on opposing transparent substrates 3 and a liquid crystal 2 is filled therein. Similarly, in FIG. 2B, triangular grooves are formed on the substrates 3, and in FIG. 2C, sinusoidal grooves are formed on the substrates 3. In FIG. 2D, rectangular grooves are formed on one of the transparent substrates 3 and the liquid crystal 2 is filled between the substrates 3. In FIGS. 2A-2C, diffraction gratings having fine grooves are formed in the substrates 3 and the liquid crystals 2 are regularly oriented along the grooves of the gratings. In FIG. 2D, the liquid crystal is oriented by the diffraction grating on one of the substrates 3.

The orientation of the liquid crystal is changed by control means (not shown) for changing the orientation of the liquid crystal to modulate an incident light. As described in connection with FIG. 1, when the electric field is used to control the orientation, electrode films are arranged on both transparent substrates 3 or the transparent substrates 3 are supported by substrates to use them as transparent electrodes. Lead wires are bonded to the electrodes and connected to a power supply.

Embodiments of the present liquid crystal light modulation device are now explained. FIG. 3 shows two embodiments of the liquid crystal light modulation device of the present invention. Elements like those shown in FIGS. 1 and 2 are designated by like numerals. Numeral 4 denotes a transparent electrode, numeral 5 denotes a power supply, numeral 1' denotes a transparent insulation of a diffraction grating, and numeral 4' denotes a transparent electrode of the diffraction grating.

Figure 3A:
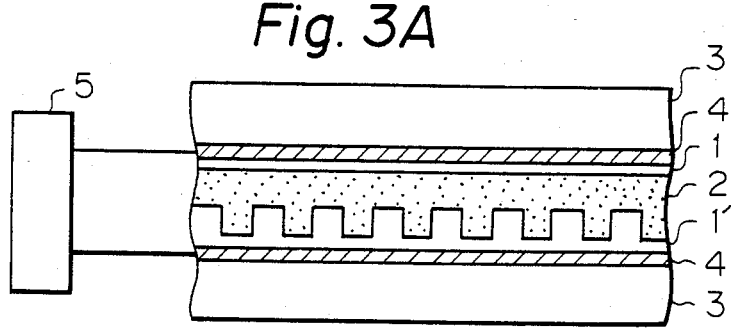
FIGS. 3A and 3B show liquid crystal light modulation devices of the present invention.
Figure 3B:
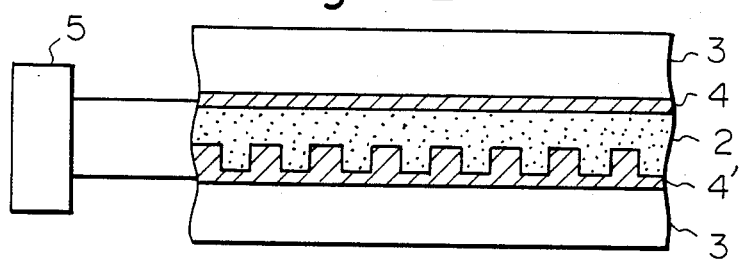

In the liquid crystal light modulation device shown in FIG. 3A, transparent electrodes 4 are arranged on transparent substrates 3 such as glass substrates, and a transparent insulator 1 and a transparent insulator 1' having a diffraction grating structure are opposingly arranged on the pair of transparent substrates 3, and a liquid crystal 2 is filled therebetween. In the liquid crystal light modulation device shown in FIG. 3B, a transparent electrode 4 and a transparent electrode 4' having a diffraction grating structure are opposingly arranged on transparent substrates 3 and a liquid crystal 2 is filled therebetween. In FIG. 3A, the transparent electrodes 4 are connected to a power supply 5 through lead wires, and in FIG. 3B, the transparent electrode 4 and the transparent electrode 4' of the diffraction grating are connected to the power supply 5 through the lead wires.

The liquid crystal 2 used in the present liquid crystal light modulation device is preferably a nematic liquid crystal having positive dielectric and a large difference between an extraordinary refraction index $n_e$ and an ordinary refraction index $n_o$ to the incident light, that is, a large refraction index difference $\Delta n$. A paradielectric liquid crystal may be used. The positive dielectric nematic liquid crystal is regularly oriented with a longitudinal axis thereof being parallel to the grooves of the diffraction grating formed in the liquid crystal light modulation device, and the paradielectric liquid crystal is oriented while it is twisted in a predetermined direction in the grooves of the diffraction grating. In the present liquid crystal light modulation device, the orientation vectors of the liquid crystal are controlled by the diffraction grating having fine grooves. The orientation of the liquid crystal oriented in a predetermined direction and/or state is changed by applying an electric field between the transparent electrodes 4 (4') by the power supply 5 so that the refraction index relative to the incident light is changed.

A principle of modulation of the present liquid crystal light modulation device is explained with reference to the device shown in FIG. 3A.

Figure 4A:
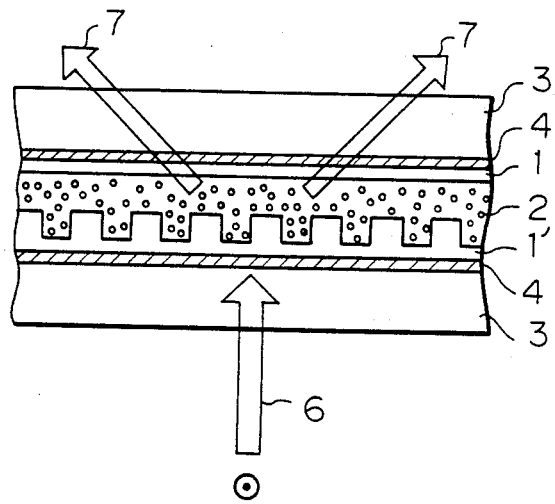
FIGS. 4A and 4B illustrate a basic principle of modulation by the liquid crystal light modulation device shown in FIG. 3A, FIGS. 5A-5G illustrate formation of the device shown in FIG. 3A.
Figure 4B:
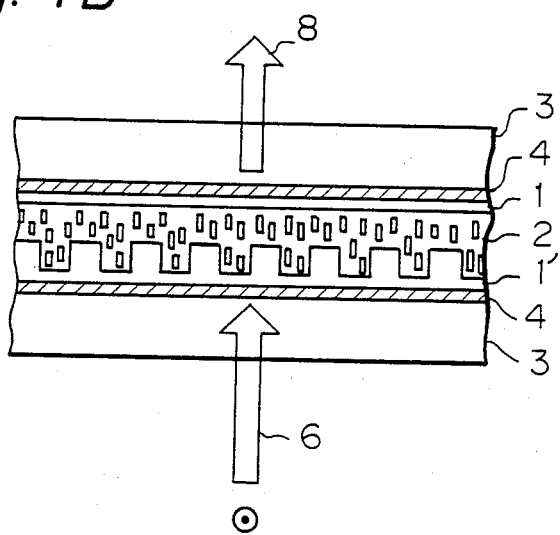

FIG. 4 illustrates a basic principle of the modulation of the liquid crystal light modulation device of the present invention. Numeral 6 denotes an incident light, numeral 7 denotes a high-order diffraction light, and numeral 8 denotes a 0-order diffraction light (transmission light). The incident light is linearly polarized normal to the plane of the drawing. The liquid crystal 2 is a positive dielectric nematic liquid crystal and is oriented in the direction of grooves of the diffraction grating (normal to the plane of the drawing) of the transparent insulator 1'.

In a static state where an electric field is not applied between the transparent electrodes 4, the liquid crystal 2 is oriented in the direction of the grooves of the diffraction grating of the transparent insulator 1', and the polarization direction of the incident light 6 is incident to the orientation direction of the liquid crystal 2 and an effective refraction index of the liquid crystal 2 is equal to the extraordinary refraction index $n_e$. If a refraction index $n_g$ of the transparent insulator 1', a wavelength $\lambda_o$ of the incident light 6 and a depth T of the groove of the diffraction grating meet the following formula (1), the incident light 6 becomes a high-order diffraction light 7 and no 0-order transmission light 8 is generated, as shown in FIG. 4A.

$$(n_e - n_g) \cdot T = \lambda_o/2 \quad (1)$$

When a predetermined field is applied between the transparent electrodes 4, the liquid crystal 2 is oriented in the direction of the electric field, that is, normal to the plane of the transparent electrodes 4 and the effective refraction index to the incident light 6 of the liquid crystal 2 changes to the ordinary refraction index $n_o$. If the following formula (2) is satisfied, the incident light 6 passes therethrough without the diffraction and it becomes the 0-order transmission light 8.

$$n_o = n_g \quad (2)$$

In the explanation of FIG. 4, the 0-order light is shut-off in the static state and transmitted under the application of the electric field, although the 0-order light may be transmitted in the static state and shut-off under the application of the electric field. The condition therefor may be represented by formula (3) and (4).

$$n_e = n_g \quad (3)$$

$$(n_g - n_o) \cdot T = \lambda_o/2 \quad (4)$$

In the above explanation, when the 0-order diffraction light 8 is noticed, it shows a function to control the transmission and shut-off of the diffraction light. However, by changing the magnitude of the applied voltage to set the direction of the orientation of the light crystal to an angle relative to the plane of the electrodes 4 (4'), the transmittance of the 0-order diffraction light can be changed and the generation of the high-order diffraction light 7 can be controlled so that the incident light 6 may be distributed or deflected.

The characteristic of the diffraction light mainly depends on the pitch P of the grooves of the diffraction grating. By reducing the pitch P, the number of high-order diffraction lights 7 generated may be reduced or only the 0-order diffraction light 8 may be generated. Usually, the pitch P of the grooves of the diffraction grating is no more than 10 μm and it is determined in accordance with the application, while the high-order diffraction light to be used and the separation angle to the 0-order diffraction light also are taken into consideration. The thickness T of the diffraction grating is usually 1.0–2.0 μm and it is appropriately determined in accordance with the application.

Formation of the liquid crystal light modulation device shown in FIG. 3A and evaluation of performance of the device thus formed are described.

FIG. 5 illustrates the formation of the liquid crystal light modulation device of FIG. 3A. Like elements to those shown in FIG. 3A are designated by like numerals. Numeral 9 denotes electrodes, numeral 10 denotes a spacer, and numeral 11 denotes a binder layer.

Figure 5A:
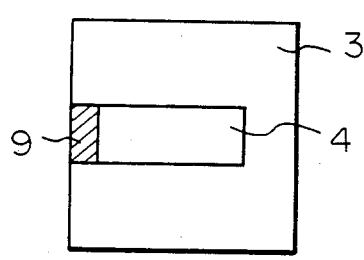
Figure 5B:
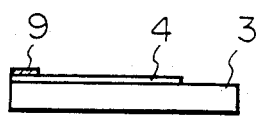
Figure 5C:
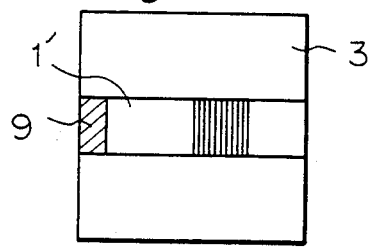
Figure 5D:
Figure 5E:
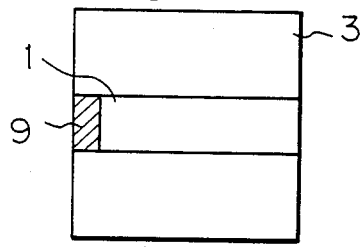
Figure 5F:
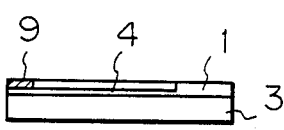
Figure 5G:
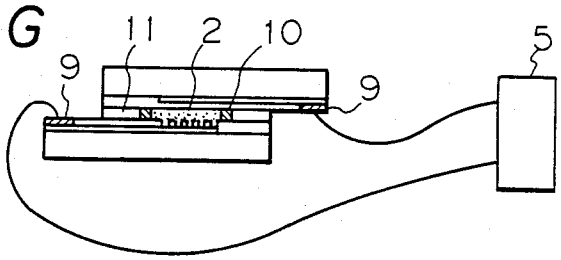

One surface of a Pyrex glass plate 3 (Corning Glass Co. 25×25×2 mm³) was polished to a flatness of within several Newton rings, ultrasonic-washed by methanol, triqurene, acetone or pure water, dried by nitrogen gas and baked in nitrogen at 120° C. for 20 minutes. Thereafter, an ITO film was formed to a thickness of 1600 Å by an ion plating method. A sheet resistance of the ITO film 4 was 20 Ω/sq and a transmittance to a He-Ne laser beam ($\lambda_o=6328$ Å) was 86%. Then, a resist film was applied, exposure was made through a mask and the ITO film 4 was etched into a pattern shown in FIG. 5A, and an Al film was formed to form the electrode 4. Then, RD-2000N (Hitachi Ltd. negative resist) was spinner-applied to the ITO film 4 to form a resist film having a thickness of 1.5 μm and it was prebaked at 140° C. for 20 minutes, and an exposure mask having a diffraction grating having a pitch of 1.3 μm formed over an area of 5×5 mm² was laid on a predetermined position on the resist film and a far violet ray was irradiated therethrough for three seconds. Then, the resist film was immersed in developing liquid and rinse liquid for 60 seconds to form the diffraction grating having the pitch of 1.3 μm. Then, SF6 glass (Kohara Optical Glass Seisakusho, refraction index 1.78 for $\lambda=7800$ Å) was formed on the entire surface to a thickness of 1.51 μm by an electron beam vapor deposition method. The substrate 3 was immersed in RD remover heated to 70° C., washed by hot water and the SF glass was lifted off. As a result, rectangular diffraction grating of the SF6 glass 1' was formed on the ITO conductive film as shown in FIG. 5B. In order to form an opposing substrate, a Pyrex glass plate (Corning Glass, 25×25×2 mm³) was processed in a similar manner to form the substrate shown in FIG. 5C. The substrates 1 shown in FIGS. 5B and 5C were placed such that the vapor deposited glass surfaces faced each other as shown in FIG. 5D, and the liquid crystal was sealed by light-curing epoxy resin 11. The thickness of the liquid crystal layer was controlled by a Mylar spacer 10 to 6 μm. The liquid crystal used was a positive dielectric liquid crystal RO-TN 403 (Rosche) having an ordinary refraction index $n_o=1.5235$ and an extraordinary refraction index $n_e=1.782$. Finally, a lead wire was bonded to the Al electrode and connected to the power supply 5.

A semiconductor laser beam ($\lambda=7800$ Å) linearly polarized in the direction of the gratings of the diffraction grating was applied normally to the liquid crystal light modulation device thus prepared. In a static state, the incident light passed as it was and no high-order diffraction light was generated, and a ratio of the 0-order transmission light to the incident light was 85%. When an Ac electric field of 20 Vp-p and 10 KHz was applied, most portions of the incident light became the high-order diffraction light and the ratio of the 0-order transmission light to the incident light was no more than 0.5%. Accordingly, the contrast ratio is more than 170.

Formation of the liquid crystal light modulation device as shown in FIG. 1A and evaluation of performance of the device thus formed are explained. The liquid crystal light modulation device described here has transparent electrode films on the surfaces of the transparent substrates 3 of the device shown in FIG. 1A, facing the liquid crystal 2 (diffraction grating).

Corning 7059 glass (Corning Glass, $\lambda=6328$ Å, refraction index 1.544) was formed to 25×25×1 mm³, both surfaces thereof were polished into planes of within several Newton rings, ultra-sonic washed by methanol, triqurene, acetone or pure water, dried by nitrogen gas and baked in nitrogen at 120° C. for 20 minutes. Brass masks were placed on the glass substrates to form stripes of 5 mm pitch, and ITO films were formed to a thickness of 1000 Å by ion plating method. MgF$_2$ films were formed to a thickness of 1146 Å on the back surfaces of the ITO films by electron beam vapor deposition method. The ITO film showed a refraction index of 1.80 to a He-Ne laser beam ($\lambda_o$=6328 Å) and a sheet resistance of 180 Ω/sq. The He-Ne laser beam was applied normally to the plane of the MgF$_2$ film and little reflection was observed. A glass (Shot #8329) for vapor deposition was formed to a thickness of 1.7 μm on the ITO film by RF sputtering method, then RD 2000N (Hitachi negative resist) was spinner-coated thereon, and it was pre-baked to form a RD 2000N film having a thickness of 1.5 μm. Then, an exposure mask having a grating of 4 μm pitch was contacted to the RD 2000N film to expose a far-violet light therethrough, and it was developed and rinsed so that a grating of RD 2000N was formed on the glass vapor deposition film. The glass vapor deposition film was etched into a grating by Ar ion etching method, and the RD 2000N mask was dissolved in remover to form glass grating grooves in the ITO film.

Another glass substrate having the ITO film was contacted to the glass substrate having the glass grating grooves thus formed with their electrode surfaces facing each other, and positive dielectric liquid crystal RO-TN 601 (Roshe, $n_o$=1.503, $n_e$=1.699) was filled in the glass grating grooves. Then, lead wires were bonded and connected to a power supply.

A He-Ne laser beam linearly polarized in the direction of the grooves of the glass grating grooves was applied normally to the liquid crystal light modulation device thus formed. The refraction index of the liquid crystal to the laser beam was the extraordinary refraction index $n_e$, and most portions of the incident light which satisfied the condition of the formula (1) became high-order diffraction light 5′. Then, an AC electric field of 10 $V_{p-p}$ and 1 KHz was applied. The liquid crystal was oriented in the direction of the electric field and the refraction index of the liquid crystal to the laser beam was the ordinary refraction index $n_o$ and most portions of the incident light which satisfied the formula (2) became 0-order transmission light. A ratio of the 0-order transmission light to the incident light under the static state was less than 1%, and that under the application of the electric field was 90%. Accordingly, the utilization efficiency of the light beam is 90% and the contrast ratio is more than 90.

Another example of modulation function of the present liquid crystal light modulation device is explained.

Figure 6:
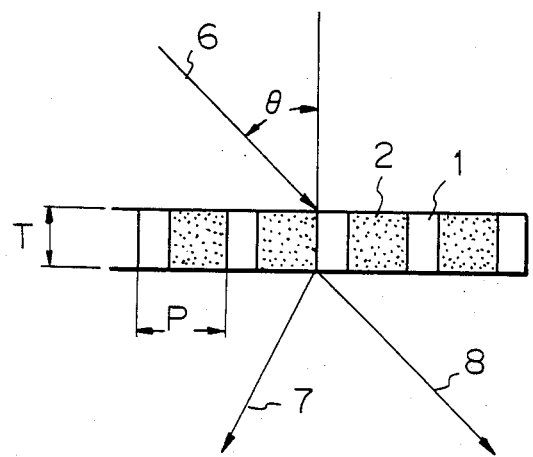
FIG. 6 illustrates another function of the liquid crystal light modulation device of the present invention, in which a light flux is obliquely applied to control an intensity ratio of a 0-order light and a 1-order light.

In FIG. 6, the incident light is applied obliquely to the device shown in FIG. 1A so that only the 0-order diffraction light and the 1-order diffraction light are generated with a variable light intensity ratio of the diffraction lights. In FIG. 6, $\theta$ indicates an incident angle of the incident light 6 and other numerals and symbols designate the elements as in the previous embodiments.

When the light flux is applied to the diffraction grating at the incident angle $\theta$, the degree of modulation $\Delta n \cdot T$ of the diffraction grating formed by the liquid crystal 2 and the transparent insulators 1 is controlled by changing the refraction index of the liquid crystal 2 so that the light intensity of the 0-order diffraction light 8 is adjusted. Since the light intensities of the high-order diffraction lights 7 also change accordingly, it is possible to change the ratio of the light intensities of the 0-order diffraction light and the predetermined high-order diffraction light. Only the 0-order and 1-order diffraction lights can be emitted by appropriately setting the parameters to meet the following conditions.

$$P > \frac{\lambda_o}{1 + \sin \theta} \tag{5}$$

$$P < \frac{2\lambda_o}{1 + \sin \theta} \tag{6}$$

$$P < \frac{\lambda_o}{1 - \sin \theta} \tag{7}$$

where the formula (5) indicates the condition for the presence of the 1-order diffraction light, the formula (6) indicates the condition for the absence of the 2-order diffraction light and the formula (7) indicates the condition for the absence of the −1-order diffraction light, and $\lambda_o$ is the wavelength of the incident light, T is the thickness of the diffraction grating, P is the pitch of the diffraction grating, $n_g$ is the refraction index of the transparent insulator 1, $n_e$ (extraordinary refraction index) is an upper limit of the controllable refraction index of the liquid crystal 2, and $n_o$ (ordinary refraction index) is a lower limit thereof.

Figure 7:
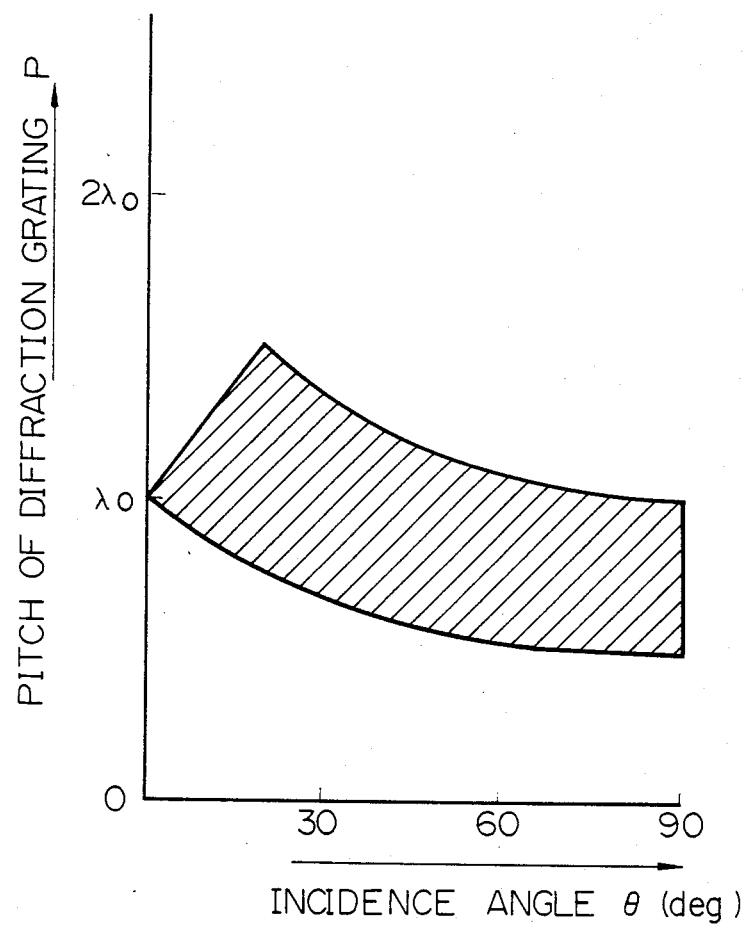
FIG. 7 shows a range for a pitch P of a diffraction grating and an incident angle $\theta$ of a light flux required to emit only the 0-order light and 1-order light from the device of FIG. 6, FIGS. 8A-8H illustrate formation of the liquid crystal light modulation device of the present invention based on the construction of FIG. 6, with different electrode structure from that of the device of FIG. 5.

If all of the three formulas are simultaneously satisfied, only the 0-order and 1-order diffraction lights are emitted. FIG. 7 shows a range of the pitch P and the incident angle $\theta$ which meet the conditions. If the following formulas (8) and (11) are satisfied, only one of the 0-order and 1-order diffraction lights can be emitted.

$$n_g = n_o \tag{8}$$

$$(n_e = n_g) \cdot T = \lambda_o/2 \tag{9}$$

$$n_g = n_e \tag{10}$$

$$(n_g = n_o) \cdot T = \lambda_o/2 \tag{11}$$

If the formula (8) or (10) is satisfied, all portions of the incident light transmit and become the 0-order diffraction light, and when the formula (9) or (11) is satisfied, the 0-order diffraction light is not generated and all portions of the incident light become the 1-order diffraction light.

Formation of the liquid crystal light modulation device having the diffraction grating as shown in FIG. 6 and evaluation of performance of the device thus formed are explained.

FIG. 8 illustrates the formation of the present liquid crystal light modulation device. Numeral 12 denotes a comb-shaped transparent electrode, numeral 13 denotes a ground electrode and numeral 14 denotes an electric field applying electrode. Other like numerals denote like elements shown in the previous embodiments.

Both sides of Tempax glass (Shot, 25×25×1 mm$^3$) were polished to flatness of within several Newton rings, ultrasonic-washed by methanol, triqurene, acetone or pure water, dried by nitrogen gas and baked in nitrogen at 120° C. for 20 minutes. Then, ITO film was formed on the glass plate to a thickness of 1000 Å by ion plating method. The ITO film showed a sheet resistance of 20 Ω/sq and a transmittance of more than 80% to the light having a wavelength of 400–900 nm. The ITO film was etched into the electrode shown in FIG. 8A. Then, Shot 83 29 vapor deposition glass (Shot) was formed to a thickness of 1.5 μm by electron beam vapor deposition method, and RD 2000N (Hitachi, negative resist) was spinner-coated to form a resist film having a thickness of 2 μm. After prebaking at 140° C. for 20 minutes, far violet light was exposed through the mask to form a relief-shaped resist grating having a pitch of 1 μm. Then, the resist grating film was etched to a depth of 1.46 μm by ion milling method to form the substrate shown in FIG. 8B.

Figure 8A:
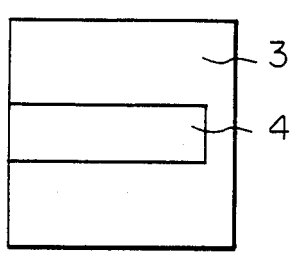
Figure 8B:
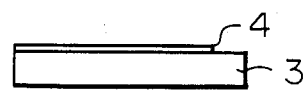
Figure 8C:
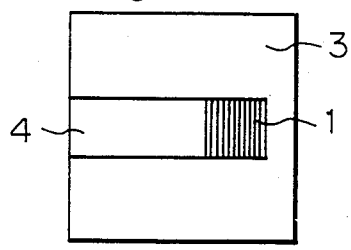

In order to form an opposing substrate, the comb-shaped electrode of the ITO film was formed on the Tempax glass plate as shown in FIG. 8C in the similar manner, and the two substrates were placed such that the transparent electrode surfaces face each other with the direction of the grooves of the diffraction grating being orthogonal to the direction of the comb-shaped electrode, and the liquid crystal was filled and sealed. The liquid crystal was positive dielectricity nematic liquid crystal ZLI 1285 (Merck). Finally, lead wires were bonded to the transparent electrodes and connected to the power supply.

A method for applying an electric field to control the orientation of the liquid crystal is explained.

A voltage is normally applied to the transparent electrodes 4 of the substrates 3 having the diffraction grating, and the opposing comb-shaped electrode 12 is composed by the ground electrode 13 and the electric field applying electrode 14. When a voltage which is in phase with the transparent electrode 4 is applied to the electric field applying electrode 14, an electric field is generated between the electric field applying electrode 14 and the ground electrode 13, and the liquid crystal 2 is oriented along the grooves. When the voltage is not applied to the electric field applying electrode 14, the electric field is generated perpendicular to the electrode surface and the liquid crystal 2 is oriented perpendicular to the plane of the diffraction grating.

Figure 8D:
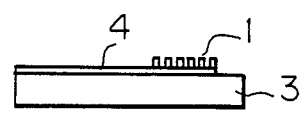
Figure 8E:
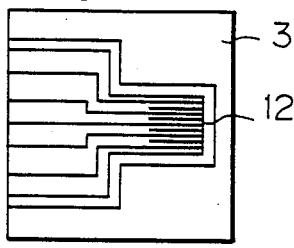
Figure 8F:
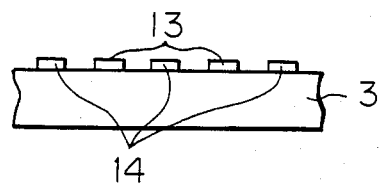
Figure 8G:
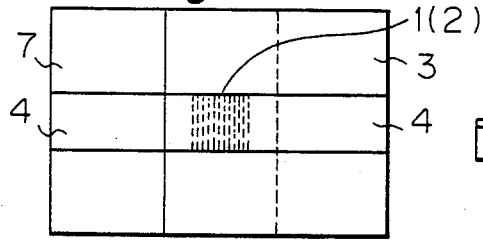
Figure 8H:
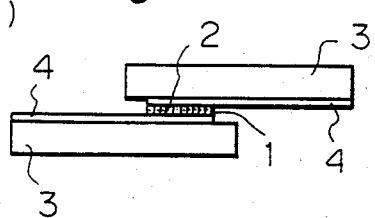

A semiconductor laser beam ($\lambda_o = 8200$ Å), linearly polarized in the direction of the grooves of the diffraction grating, was applied to the liquid crystal light modulation device of FIG. 8D at an incident angle $\theta = 24°$ and a rectangular A.C. voltage of 10 KHz and 30 $V_{p-p}$ was applied. A switching response time from the 0-order diffraction light to the 1-order diffraction light was 1 m/sec, and a switching response time from the 1-order diffraction light to the 0-order diffraction light was 0.5 m/sec. The light flux utilization factor was more than 80% and the contrast ratio was 100.

A substrate having the comb-shaped electrode shown in FIG. 8 substituted by a plane electrode and a substrate having a diffraction grating were assembled to a liquid crystal light modulation device and a paradielectric liquid crystal was filled, the device was maintained at a temperature of 60° C. and a He-Ne laser beam ($\lambda_o = 6328$ Å) linearly polarized in the direction of the grooves of the grating was applied at an incident angle of 24°. The switching between the 0-order diffraction light and the 1-order diffraction light was attained by applying positive and negative pulse voltages across the electrodes. The light flux utilization efficiency was more than 80%, the contrast ratio was 100, and the switching response time between the 0-order diffraction light and the 1-order diffraction light was 20 μsec.

In the above embodiment, the light control device which utilizes the change of the light intensity between the 0-order diffraction light and the 1-order diffraction light was explained. A light control device which utilizes a change of light intensity between the 0-order diffraction light and the 2-order or higher-order diffraction light is now explained.

Figure 9:
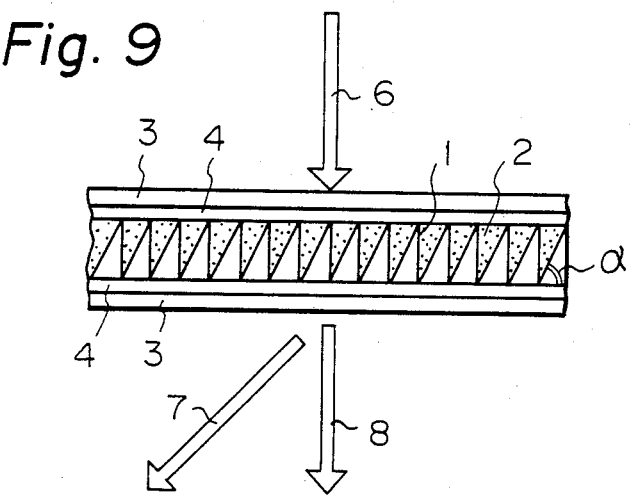
FIG. 9 shows a liquid crystal light modulation device of the present invention which uses a brazed diffraction grating.

FIG. 9 shows a liquid crystal light modulation device having a brazed grating. The numerals denote like elements shown in FIG. 8. The brazed grating can transmit an energy of an incident light only to a diffraction light of a certain order. In FIG. 9, a braze angle α is 62.5°, and the incident light is linearly polarized in the direction of the grooves of the diffraction light and applied normal to the present device. The energy of the incident light is concentrated to the 0-order diffraction light and the 3-order diffraction light and most portions of the emitted light consist of those diffraction lights. A rectangular A.C. voltage of 10 KHz and 30 Vp-p was applied to the transparent electrodes 4. A switching response time from the 0-order diffraction light to the 3-order diffraction light was 1 m/sec, the switching response time from the 3-order diffraction light to the 0-order diffraction light was 0.5 m/sec, the light flux utilization efficiency was more than 80% and the contrast ratio was 100.

The liquid crystal light modulation devices shown in the above embodiments are transmission-type devices, although they may be reflection-type devices. The reflection type liquid crystal light modulation device may be formed by using a high reflection member for one of the transparent electrodes, transparent insulators or transparent substrates, or by forming an additional reflection film. Accordingly, by selecting the type of the device (transmission type or reflection type) and the shape and dimension of the diffraction grating, various light modulation devices can be formed, which may be applied to various apparatus such as a light switch for a liquid crystal printer, a liquid crystal display of direct view type or projection type, and a light splitting device, a light deflection device and a light switch for light communication.

When the diffraction grating is of triangular shape, the formula (1) is represented by $$(n_e - n_g) \cdot T = \lambda_o \tag{1'}$$

An application of the present liquid crystal light modulation device to a color filter is now explained.

In displaying or recording a color image, three color filters of R, G, B and C, M, Y are formed in one element, and one or more of the three colors are selectively illuminated to display the color image, or lights separated by the three color filters and transmitted therethrough are selectively received to record the color image.

When a prior art color filter element is used, three color picture cells are required for each picture cell, and three sets of photosensing devices, and light emitting devices or light bulbs are required. Thus, the construction is complex and the light flux utilization efficiency is low, and the color information displayable or available is limited.

When the present liquid crystal light modulation device is used, three colors, for example, C, M and Y can be displayed by a single device. The application of the liquid crystal light modulation device constructed in accordance with FIG. 1A is explained. A phase-type diffraction grating normally has a dependency on wavelength. This nature is utilized to realize the color filter.

In FIG. 1A, the width of the liquid crystal 2 or the transparent insulator 1 which has a higher refraction index is given by l and the width of the one having a lower refraction index is given by S.

As the light flux transmits through the diffraction grating in which the refraction index periodically varies to the wavelength of the incident light, the incident light having a wavelength which satisfies a formula (12) does not generate the 0-order diffraction light but generates high order diffraction lights.

$$\Delta n \cdot T = (m + \tfrac{1}{2}) \cdot \lambda_o \quad (12)$$

(m=0, 1, 2, ...)

where $\Delta n$ is a difference between refraction indices of the diffraction grating (difference between refraction indices of two materials forming the grating), and $\lambda_o$ is a wavelength of the incident light.

The 0-order diffraction light having an other wavelength is present. Thus, a color filter having a spectrotransmittance characteristic in which the transmittance for the 0-order transmission light is low around $\lambda_o$ is formed.

The left side of the formula (12), that is, $\Delta n \cdot T$ or a product of the difference between the refraction indices of the diffraction grating and the thickness, is defined as a grating modulation index. T is constant but $\Delta n$ is variable by changing the orientation of the liquid crystal or the refraction indices. Accordingly, the spectrotransmittance characteristic of the incident light is controllable.

Figure 10A:
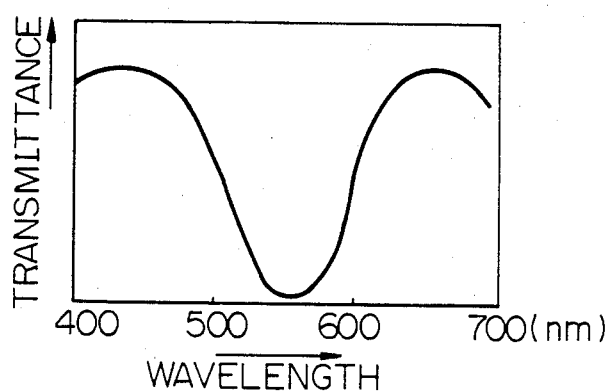
FIGS. 10A-10C show spectro-transmittance characteristics for cyan, magenta and yellow when the liquid crystal light modulation device of the present invention based on the construction of FIG. 6 is used as a color filter.
Figure 10B:
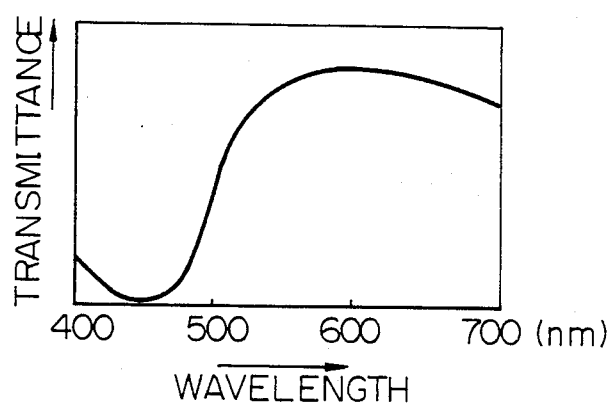

When the present liquid crystal light modulation device is used as a color filter, a definite separation angle between the 0-order transmission light and the high order diffraction light, particularly the 1-order diffraction light is necessary and hence there are limitations on the pitch P and the thickness T of the diffraction grating. In the discussion of the present invention, the pitch P is usually no more than 10 μm and the thickness T is no less than 1.5 μm. In addition to the parameters, the refraction index difference $\Delta n$ and the thickness T of the diffraction grating in the formula (1), a ratio of the widths l and S of the materials of the grating affects to the spectroscopic characteristic of the present device. The l/S ratio is preferably 3/7 to 5/5 where l is the higher refraction index and S is the lower refraction index. By selecting the l/S ratio within this range, the color filter having the spectrotransmittance characteristic shown in FIG. 10 can be formed.

FIG. 10 shows spectro-transmittance characteristic for three colors, cyan, magenta and yellow obtained by the color filter constructed by the present liquid crystal light modulation device.

Formation and evaluation of performance of the liquid crystal light modulation device having the characteristic shown in FIG. 10 are explained.

FIG. 11 illustrates the formation of the present liquid crystal light modulation device. The numerals the same as those in the previous embodiments denote like elements.

Both sides of Corning 7059 glass (Corning Glass, 50×50×2 mm³) were polished to a flatness of within several Newton rings, ultrasonic-washed by methanol, triquerene, acetone and pure water, dried in nitrogen gas and baked in nitrogen at 120° C. for 20 minutes. Then, an ITO film was formed on the glass plate to a thickness of 1000 Å by ion plating method. The ITO film showed a sheet resistance of 20 Ω/sq and a transmittance of more than 80% for a wavelength between 380 and 780 nm. The ITO film was etched into the electrode shown in FIG. 11A. Then, an $SiO_2$ film having a thickness of 3 μm was formed by RF sputtering method, and RD 2000N (Hitachi, negative resist) was spinner-coated to form a resist film having a thickness of 1.5 μm. After prebaking at 140° C. for 20 minutes, a far-violet ray was exposed through the mask and it was developed and rinsed to form a relief-shaped resist grating having a pitch of 2.5 μm. Then, the $SiO_2$ film was etched to a depth of 2.4 μm by a reactive ion etching method using $CF_4$-$O_2$ gas mixture. The substrate thus formed is shown in FIG. 11B.

An opposing substrate constructed as shown in FIG. 11A was formed by the same Corning 7059 glass. The two substrates were placed such that the transparent electrodes 4 face each other, and the liquid crystal 2 was filled and sealed. The liquid crystal 2 used was a positive dielectric liquid crystal RO-TN200 (Rosche). Finally, lead wires were bonded to the transparent electrodes 4 and connected to the power supply 5 to form the device shown in FIG. 11C.

Figure 10C:
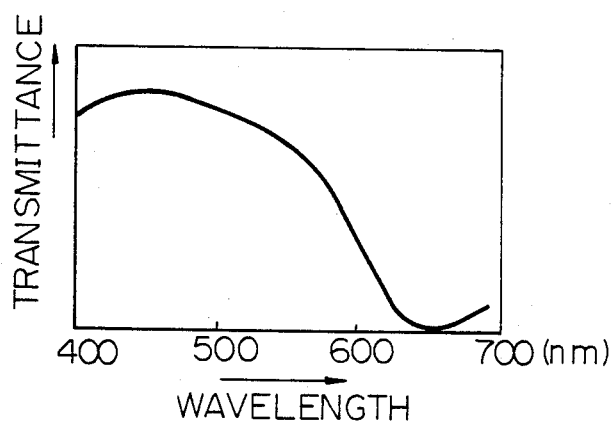

A white light polarized in the direction of the grooves of the grating, that is, normal to the plane of the drawing was applied normal to the device shown in FIG. 11C. In a static state, the liquid crystal 2 and the polarization direction of the white light are coincident and the white light is sensitive to the extraordinary refraction index $n_e$. The refraction index difference $\Delta n$ and the thickness T of the grating meet the formula (12) for the wavelength $\lambda_o = 550$ nm, and the spectroscopic distribution of the 0-order transmission light shows magenta as shown by a curve of FIG. 10A. A voltage of 1 KHz and 4 Vp-p was applied to the transparent electrodes. The formula (12) was met for the wavelength $\lambda_o = 450$ nm and the spectrogram of the 0-order transmission light showed yellow as shown by a curve of FIG. 10B. Then, a voltage of 8 V p-p was applied. The formula (12) was met for the wavelength $\lambda_o = 640$ nm and the spectrogram of the 0-order transmission light showed cyan as shown in FIG. 10C.

In this manner, the color filter having variable transmittance for cyan, magenta and yellow is formed.

A color filter for R, G and B may be formed by using a liquid crystal having a larger refraction index difference between the extraordinary refraction index $n_e$ and the ordinary refraction index $n_o$.

By using the present liquid crystal light modulation device as the color filter, it may be used as a color image display device as well as a color computer element for color operation.

In the liquid crystal printer, a white light source is usually used. Except when the present device is used as the color filter element, it is preferable that the device have a flat spectro-transmittance characteristic when a light having a plurality of wavelength components is modulated. A liquid crystal light modulation device having a flat spectro-transmittance characteristic, that is, substantially free from wavelength dependency is described.

Figure 12A:
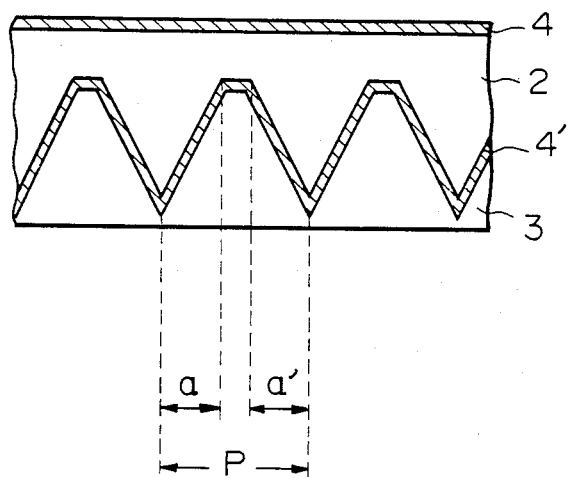
Figure 12B:
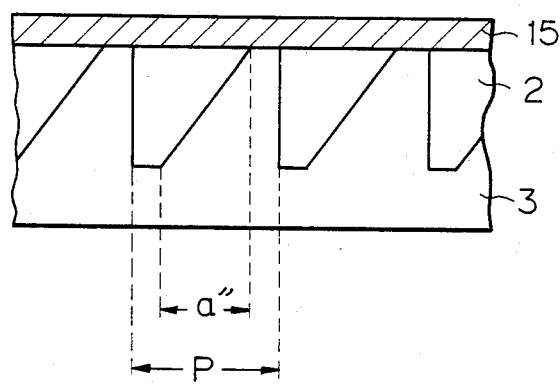

FIG. 12 illustrates conditions of the shape of a diffraction grating in a liquid crystal light modulation device having a flat spectro-transmittance characteristic. FIG. 12A shows an electric field controlled device and FIG. 12B shows a thermo-controlled device. The like elements to those shown in the previous embodiments are denoted by like numerals. Numeral 15 denotes a transparent heater, P indicates a pitch of the grooves of the diffraction grating, and a, a' and a" indicate projection lengths of an oblique side of the grating in one pitch of the grating, to the plane of the diffraction rating (substrate plane).

In FIG. 12A, a pedestal-shaped diffraction grating is formed in the transparent substrate 3, a transparent electrode 4' is formed on the diffraction grating surface, and a liquid crystal 2 is filled between the transparent electrode 4' and an opposite flat transparent electrode 4. The orientation of the liquid crystal 2 is changed by an electric field applied between the transparent electrodes 4 and 4' so that the refraction index is controlled. FIG. 12B shows a liquid crystal light modulation device which controls the refraction index of the liquid crystal 2 by heat. It has the transparent heater 15. The liquid crystal 2 is intermittently disposed between the heater 15 and the transparent substrate 3 having a sawtooth diffraction grating. In the liquid crystal light modulation devices shown in FIGS. 12A and 12B, the projection length for one pitch of the grooves of the diffraction grating, that is, the projection length a+a' or a" of the oblique side for the pitch P, meets the following condition.

$$(a+a')/l \geq \tfrac{1}{2} \quad (A)$$

$$a''/l \geq \tfrac{1}{2} \quad (B)$$

If the projection area of the oblique side of the diffraction grating is no less than 50% of the total projection area, the refraction index of the liquid crystal 2 is controlled and the diffraction light can be controlled independently from the wavelength of the incident light.

As described above, the control of the diffraction light means control of the light intensity of the 0-order light by changing the refraction index of the variable refraction index medium, splitting the of incident light and controlling of the light intensities of the split light fluxes.

The shape of the diffraction grating to attain the flat spectro-transmittance is preferably triangular because of easiness of manufacture and orientation capability.

Formation of a liquid crystal light modulation device having a triangular diffraction grating and evaluation of performance of a spectro-transmittance of the device thus formed are explained.

FIG. 13 illustrates the formation of the liquid crystal light modulation device having the triangular diffraction grating. The numerals used in the previous embodiment denote like elements.

Figure 13A:
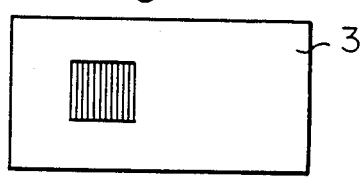
FIGS. 13A-13F illustrate formation of the liquid crystal light modulation device having the flat spectro-transmittance characteristic and having a triangular diffraction grating.
Figure 13B:
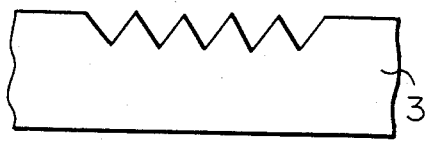
Figure 13C:
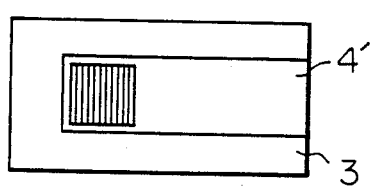
Figure 13D:
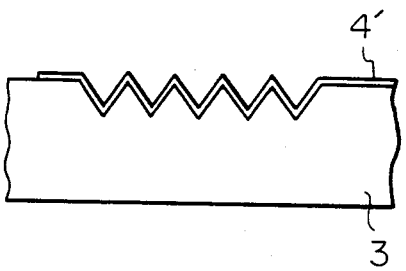
Figure 13E:
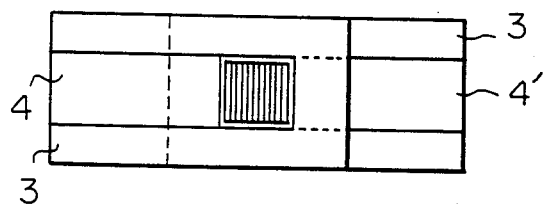
Figure 13F:
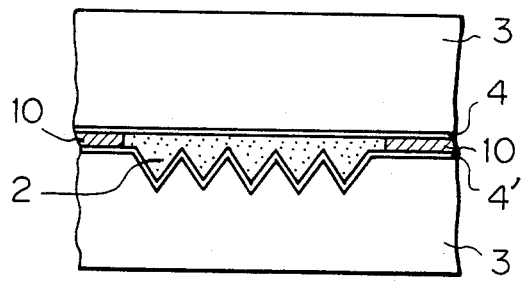

Both sides of a transparent ABS resin acryrostylene to nitrile butadiene-styrene-stylene polymer) substrate 7 were polished to flat surfaces, and the triangular grating having a pitch of 6 μm and a depth of 6 μm was formed in a predetermined area (10×10 mm²) on one side by a ruling engine as shown in FIG. 13A. Then, as shown in FIG. 13B, the ITO film 4' was formed in a belt shape to a thickness of 1000 Å over the grating area and the other area. The similar transparent ABS substrate 3 without grating was prepared and the ITO film 4 was deposited thereon in belt shape, and Teflon spacers 10 having a thickness of 1 μm were placed in the area other than the grating area, the two substrates 3 were arranged to face each other with the ITO films 4 and 4' being opposed to each other, and the nematic liquid crystal 2 was filled in the clearance to complete the device shown in FIG. 13F. Method and result of evaluation of performance of a spectro-transmittance of the liquid crystal light modulation device of FIG. 13F are described.

Figure 14:
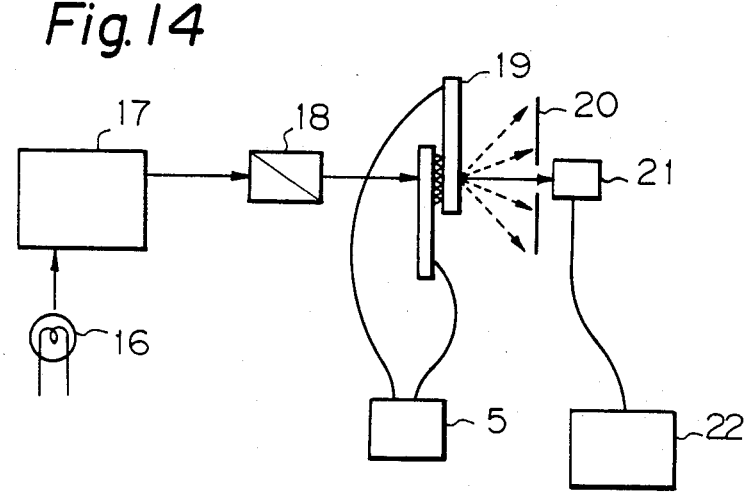
FIG. 14 shows an apparatus used to measure the spectro-transmittance of the liquid crystal light modulation device shown in FIG. 13.

FIG. 14 shows the method of evaluation of the performance of the light modulation device in the above embodiment. Numeral 16 denotes a light source, numeral 17 denotes a spectrometer, numeral 18 denotes a polarizer, numeral 19 denotes a liquid crystal light modulation device, numeral 20 denotes an aperture, numeral 21 denotes a photosensor, numeral 5 denotes a drive power supply and numeral 22 denotes an optical output display. The light emitted from the light source 16 is spectroscoped into lights having respective wavelengths by the spectrometer 17 and the lights are polarized by the polarizer 18 along the grooves of the diffraction grating of the liquid crystal light modulation device 19. Those lights are sequentially applied to the diffraction grating area of the liquid crystal light modulation device 19. By turning on and off the power supply 5, the incident light to the diffraction grating of the liquid crystal light modulation device 19 is totally transmitted or diffracted. Only the 0-order diffraction light of the diffraction lights emitted from the liquid crystal light modulation device 19 passes through the aperture 20, is captured by the photosensor 21 and is measured by the optical output display 22. The above measurement is repeated for the incident lights of the respective wavelengths.

In the static state where no electric field is applied between the ITO electrodes 4 and 4' of the liquid crystal light modulation device 19, the liquid crystal is oriented along the grooves of the grating and the incident light is sensitive to the extraordinary refraction index $n_e$ of the liquid crystal. When a predetermined electric field is applied between the ITO electrodes 4 and 4', the liquid crystal 2 is oriented in the direction of the electric field, that is, orthogonal to the direction of the grooves of the diffraction grating and the incident light is sensitive to the ordinary refraction index $n_o$ of the liquid crystal. The diffraction efficiency $\eta_0$ of the 0-order diffraction light is represented by $$\eta o = \text{sinc}^2\left(\pi \cdot \frac{\Delta n \cdot T}{\lambda_o}\right) \quad (13)$$

where $\lambda_o$ is the wavelength of the incident light, $n_g$ is the refraction index of the transparent substrate 3 having the diffraction grating structure, T is the height of the diffraction grating and $\Delta n = |n_e - n_g|$ or $\Delta n = |n_o - n_g|$. From the formula (13), when $\Delta n = 0$, $n_o = 1$ and when $\Delta n \cdot T = m\lambda$ (m=1, 2, 3, ...), $\eta_0 = 0$.

Figure 15:
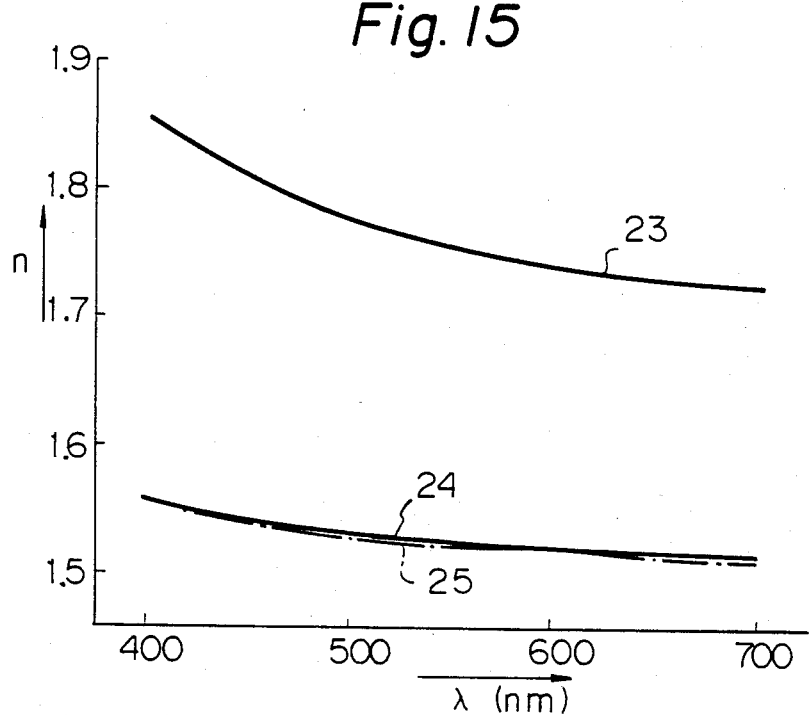
FIG. 15 shows a wavelength dependency of the refraction index of the liquid crystal used in the liquid crystal light modulation device shown in FIG. 13 and the refraction index of the substrate.

FIG. 15 shows wavelength dependency of the refraction indices of the liquid crystal E7 (BDH) and the transparent ABS substrate 3 used in the liquid crystal light modulation device 19. A curve 23 shows the extraordinary refraction index $n_e$ of the liquid crystal 2, a curve 24 shows the ordinary refraction index $n_o$ of the liquid crystal 2, and a curve 25 shows the refraction index $n_g$ of the transparent substrate 3. As shown, the ordinary refraction index $n_o$ of the liquid crystal 2 and the refraction index $n_g$ of the transparent substrate 3 are essentially the same.

Figure 16:
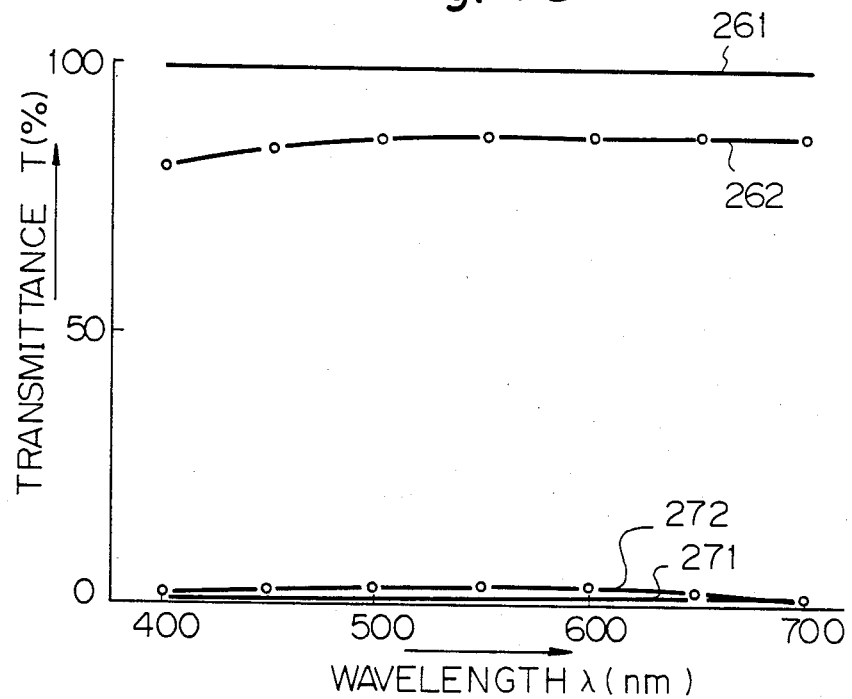
FIG. 16 shows a spectro-transmittance of a 0-order transmitted light of the liquid crystal light modulation device shown in FIG. 13 as well as a theoretical value and an experimental value in light transmission, and a theoretical value and an experimental value in light shut-off.

FIG. 16 shows a spectro-transmittance characteristic of the 0-order transmission light of the present liquid crystal light modulation device. Curves 261 and 262 show theoretical values of the transmittance when the light transmits and measurements by the above method, and curves 271 and 272 show theoretical values and measurements of the transmittance when the light is shut off. The theoretical values are determined in accordance with the formula (13) and the measurements are obtained by the optical arrangement shown in FIG. 14. The difference between the theoretical values and the measurements is primarily due to the end reflection of the transparent ABS substrate 3. If anti-reflection means is provided, the measurements approach the theoretical values more closely. As seen from FIG. 16, the present optical system has no wavelength dependency and shows a flat contrast to a white light. An accumulated contrast ratio for wavelengths of 400-700 nm is more than 40 and the light flux utilization efficiency when the light transmits is more than 80%. When a rectangular voltage of 1 KHz and 15 V (effective voltage) is applied, the rise time response is 0.5 msec and the fall time response is 2 msec.

Figure 17:
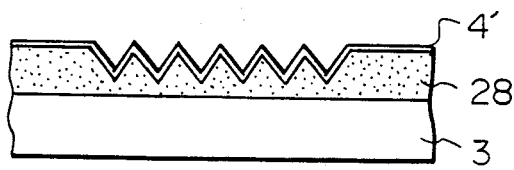
FIG. 17 shows a master substrate used to mass-produce the liquid crystal light modulation device.

An embodiment for mass producing the present liquid crystal light modulation device is explained. A triangular diffraction grating similar to that of the previous embodiment is formed at a predetermined area ($10 \times 10$ mm$^2$) of a mirror-polished Al plate ($50 \times 25 \times 5$ mm$^3$) by a ruling engine, and it is used as a master. Then, the master is placed in a vacuum deposition apparatus, removal oil is vapor deposited on the master surface, and an ITO film is formed thereon to a thickness of 1000 Å. Then, the master and a corning 7059 glass (Corning Glass, $50 \times 25 \times 2$ mm$^3$) are bonded to both sides of a thermosetting resin which comprises epoxy resin and diethyl amino propyle amine as a curing agent, and they are dried in vacuum and heated at 60° C. for one hour to cure the resin. After heating, the master is removed from the glass plate at a room temperature to form the glass substrate shown in FIG. 17, in which numeral 28 denotes the epoxy resin. The liquid crystal light modulation device is formed by using the glass substrate having the diffraction grating shown in FIG. 17 in a similar manner to that of the previous embodiment.

The master described above is used to form the triangular diffraction grating. The rectangular, sinusoidal, pedestal and asymmetric masters may be formed in a similar method.

An application of the present liquid crystal light modulation device is explained. In the present device, the orientation of the liqid crystal oriented by the grooves of the fine diffraction grating is controlled by the orientation control means to change the refraction index relative to the incident light so that the condition of the diffraction grating sensed by the incident light is changed. The present liquid crystal light modulation device may be used as a light switch (shutter) which controls transmission and shut-off of the 0-order light. If the separation angle between the 0-order light and the high order diffraction light (particularly ±1-order diffraction light) is small, the high order diffraction light is flared and the S/N ratio is reduced. In order to substantially space the high order diffraction light from the 0-order light, or prevent the generation of the high order diffraction light, the pitch of the diffraction grating may be reduced but the easiness of manufacture is lowered.

A liquid crystal light modulation device described below is designed to resolve the problem of the non-signal diffraction light to improve the S/N ratio.

FIG. 18 shows a liquid crystal light modulation device having diffraction light shut-off means. Like elements to those shown in the previous embodiments are designated by like numerals. Numeral 29 denotes the diffraction light shut-off means.

Figure 18A:
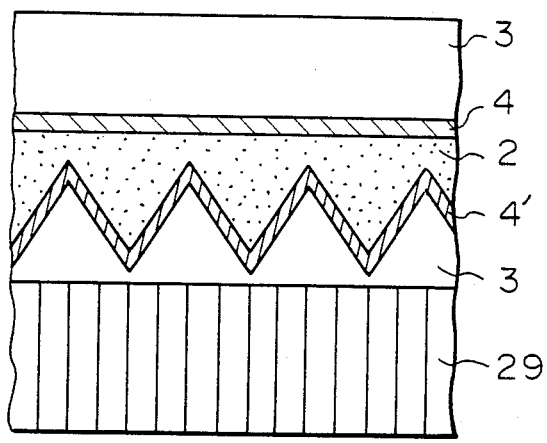
FIGS. 18A and 18B show a liquid crystal light modulation device having high-order diffraction light shut-off means.

In the liquid crystal light modulation device of FIG. 18A, the transparent electrode 4' is formed on the surface of the diffraction grating 4 formed in the transparent substrate 3, and the liquid crystal 2 is filled between the transparent electrode 4' and the opposing planar transparent electrode 4. The orientation of the liquid crystal 2 is changed by the electric field applied by the transparent electrodes 4 and 4' so that the refraction index is controlled. The diffraction light shut-off means 29 is contacted to the transparent substrate 3, and the light flux is applied to the device through the planar transparent electrode 4.

Figure 18B:
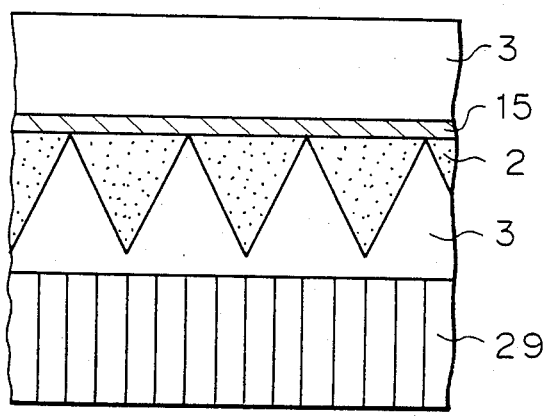

In the liquid crystal light modulation device shown in FIG. 18B, the liquid crystal 2 whose orientation is changed by heat is filled between the diffraction grating formed in the transparent substrate 3 and the transparent heater 15. The diffraction light shut-off means 29 is contacted to the transparent substrate 3 having the diffraction grading. The diffraction light shut-off means 29 includes light wave guide, light absorber or light scatterer. The light wave guide may be a fiber plate having a definite aperture number, a refraction index distributed lens, or an interlaced planar light wave guide, and it is arranged at a predetermined distance from a light flux emission end of the light modulation device, or contacted thereto. It is preferably contacted to the device in order to reduce the size of the device.

The light flux applied normal to the light wave guide, or at an incident angle smaller than an acceptable half-angle of the aperture number of the light wave guide, is guided through the light wave guide and emitted therefrom, but the light flux having the incident angle larger than the acceptable half-angle is not guided but the energy thereof is lost in the light wave guide and no stray light is emitted. The light absorber or the light scatterer may be opaque material which can absorb or scatter the light obliquely applied to the plane of the light absorber or light scatterer. A light roover formed by alternately stacking transparent plates, such as glass or plastic, and opaque films and slicing the stack normal to the plane, an arrangement of opaque plates or tapes at a constant intervals, or a bound of hollow pipe formed by opaque material or coated with opaque films may be used as the light shut-off member.

Figure 19:
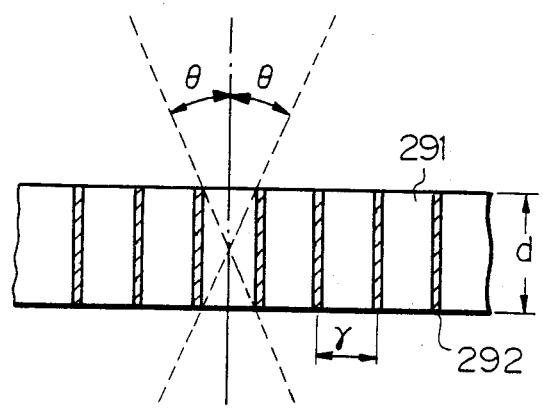
FIG. 19 shows high-order diffraction light shut-off means having a light absorber or a light scatterer.

FIG. 19 shows an embodiment of the diffraction light shut-off means having the light absorber or the light scatterer. Numeral 291 denotes the light transmission member, numeral 292 denotes the light absorber or light scatterer, d indicates a thickness, $\gamma$ indicates an aperture diameter, and $\theta$ indicates an incident angle in the air of the diffraction light to the light shut-off means. The diffraction light having the predetermined order, which is to be transmitted is applied to the light shut-off means at $\theta = 0°$. A condition required for the light shut-off means to shut off other diffraction lights is given by the following formula $$\sin\theta_{min} \gtrsim \frac{n_a \cdot \gamma}{\sqrt{d^2 + \gamma^2}} \qquad (14)$$

where $\theta_{min}$ is a minimum angle between the diffraction light of the predetermined order and other diffraction lights to be shut off, and $n_a$ is the refraction index of the light transmission member 291.

When the present light shut-off means is actually used, the leakage light or stray light is small even if the condition slightly deviates from the above formula. The d and γ are preferably designed to conform to the specification of the apparatus.

When the light flux is applied to the light shut-off means at an incident angle larger than $\theta_{min}$, the incident light is scattered or absorbed by the light scatterer or light absorber and most of the energy is lost in the light shut-off means. On the other hand, the diffraction light of the predetermined order, applied at the incident angle lower than $\theta_{min}$, is transmitted through the light shut-off means and emitted therefrom.

FIG. 20 illustrates formation of the liquid crystal light modulation device constructed as shown in FIG. 18A and having the light shut-off means having the light wave guide. Like numerals to those shown in FIG. 18A denote like elements.

Figure 20A:
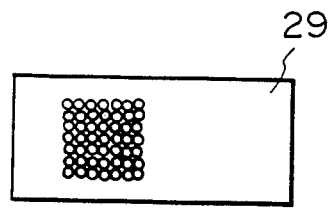
FIGS. 20A-20F illustrate formation of a liquid crystal light modulation device constructed as shown in FIG. 18A and having high-order diffraction light shut-off means having a light wave guide.
Figure 20B:
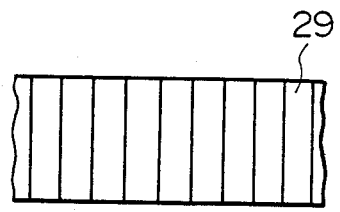

A fiber plate having a core diameter of 25 μm and an aperture number 0.3 was sliced in a plane normal to an optical axis of the fiber, and both sides of the slice were polished to form the substrate 29 having 50×25×2 mm³ as shown in FIG. 20A. Then, ultraviolet ray setting resin was dropped onto a predetermined area of the substrate 29, and a grating master which had been previously prepared by cutting by a ruling engine was pressed onto the ultraviolet ray setting resin, an ultraviolet ray was exposed, and then the master was removed to form the diffraction grating resin film 3 on the substrate 29 having the fiber. The diffraction grating formed in the present embodiment has a pitch P, of the grooves, of 1.87 μm, a depth T of the grating of 2.26 μm and is of an isosceles triangle shape. Then, the ITO film 4' was formed in belt shape to a thickness of 1000 Å on the diffraction grating area and the other area. Then, the ITO film 4 was vapor deposited in belt shape on the transparent glass plate 3 of 50×25×1 mm³, and the two substrates were bonded by bonding material which served as a spacer with the ITO films 4 and 4' facing each other, and the positive dielectric nematic liquid crystal 2 was filled therebetween to form the device shown in FIG. 20F.

FIG. 21 illustrates the formation of the liquid crystal light modulation device constructed as shown in FIG. 18A and having the diffraction light shut-off means having the light absorber. Like numerals to those in FIG. 20 denote like elements. A plurality of transparent plastic substrates having a thickness of 0.5 mm and a refraction index of 1.5 were prepared, light absorbing bonding materials were filled between the substrates, the substrates were stacked and pressed, the stack was sliced perpendicular to the plane to a thickness of 3 mm and the slice was polished to form the light roover substrate 29 of 50×25×3 mm³ as shown in FIG. 21A. Then, ultraviolet ray setting resin was dropped onto a predetermined area of the substrate 29, and a master for the diffraction grating which had been previously prepared by cutting by the ruling engine was pressed onto the ultraviolet ray setting resin, an ultraviolet ray was exposed through the master, and then the master was removed to form the diffraction grating resin film 3 on the light roover substrate 29. The diffraction grating formed in the present embodiment has a pitch P of the grooves of the diffraction grating of 1.87 μm and the depth T of the grating of 2.26 μm, and the direction of the grooves of the diffraction grating coincides with the direction of the slit of the light roover. Then, the ITO film 4' was formed in belt shape to a thickness of 1000 Å on the diffraction grating area and the other area as shown in FIG. 21B. Then, the ITO film 4 was vapor deposited to another transparent glass plate 3 of 50×25×1 mm³ in the same manner, and the two substrates 3 were bonded by bonding material which served as a spacer with the ITO film 4 and 4' facing each other, and the positive dielectric nematic liquid crystal 2 was filled therebetween to form the device shown in FIG. 21F.

Figure 20C:
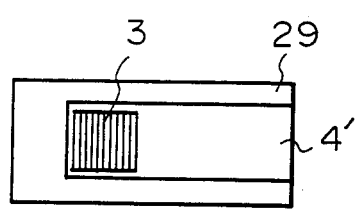
Figure 20D:
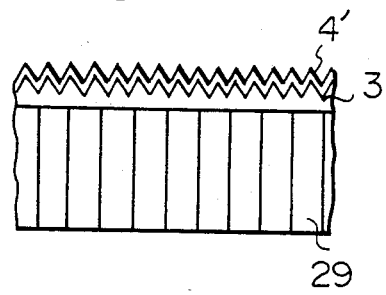
Figure 20E:
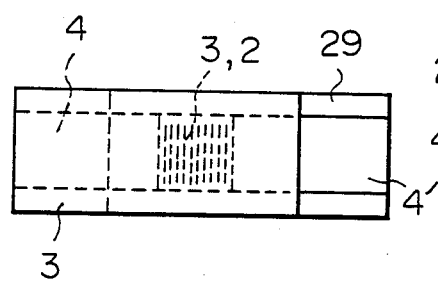
Figure 21A:
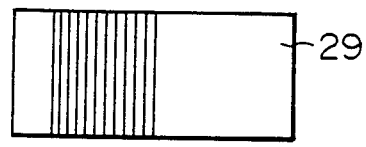
FIGS. 21A-21F illustrate formation of a liquid crystal light modulation device constructed as shown in FIG. 18A and having high-order diffraction light shut-off means having a light wave guide.
Figure 21B:
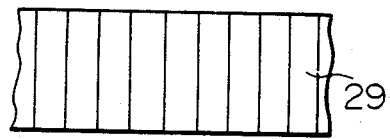
Figure 21C:
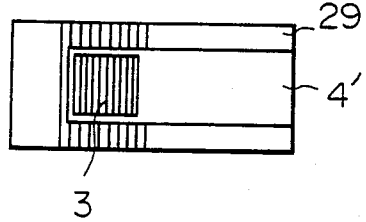
Figure 21D:
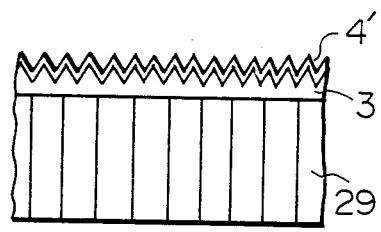
Figure 21E:
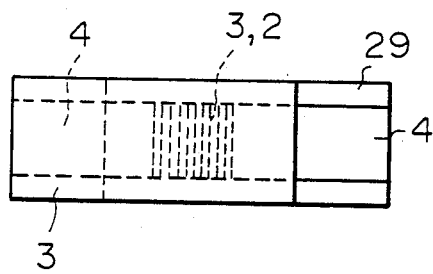
Figure 21F:
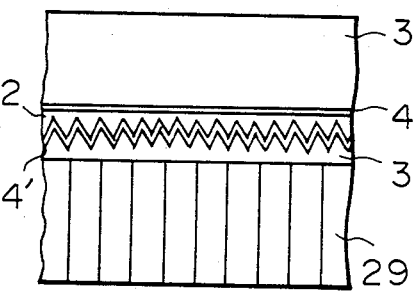

Evaluation of the performance of the liquid crystal light modulation devices shown in FIGS. 20C and 21C is explained.

Figure 22:
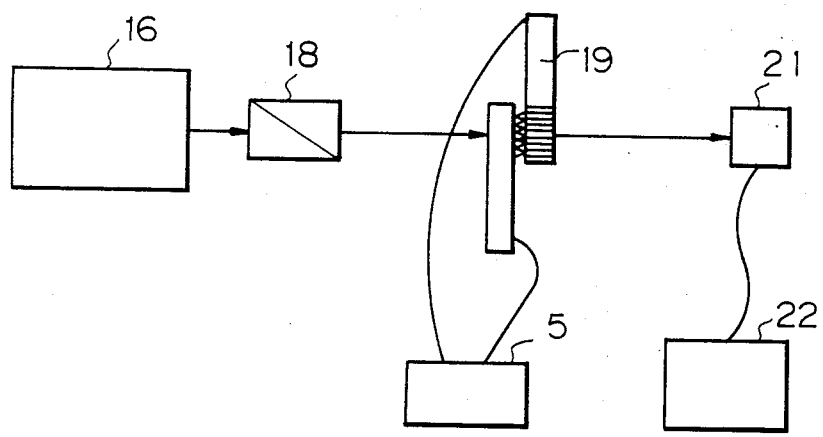
FIG. 22 shows an apparatus used to measure characteristics of the liquid crystal light modulation devices shown in FIGS. 20C and 21C.

FIG. 22 shows a measurement instrument used to measure the performance of the liquid crystal light modulation devices shown in FIGS. 20C and 21C. Like numerals to those in FIG. 14 denote like elements.

The light emitted from the light source 16 is polarized by the polarizer 18 into a light polarized in the direction of the grooves of the diffraction grating of the liquid crystal light modulation device 19, and the polarized light is applied to the diffraction grating area of the light modulation device 19. By applying an electric field to the liquid crystal of the liquid crystal light modulation device by the drive power source 5, the emission of the 0-order (diffraction) light is controlled. The light reaching the photosensor 21 depending on the presence or absence of the electric field is detected and observed by the optical output display 22.

In the static state where no electric field is applied, the liquid crystal is oriented in the direction of the grooves of the diffraction grating of the liquid crystal light modulation device, and the incident light is sensitive to the extraordinary refraction index $n_e$ of the liquid crystal. Under the application of the electric field, the liquid crystal is oriented in the direction of the electric field, that is, normal to the substrate plane, and the incident light is sensitive to the ordinary refraction index $n_o$ of the liquid crystal. The diffraction efficiency $\eta o$ of the 0-order transmission diffraction light in the isosceles triangular diffraction grating shown in FIGS. 20C and 21C is given by the formula (13), where $\lambda o$ is the wavelength of the incident light, $n_g$ is the refraction index of the transparent resin having the diffraction grating and T is the depth of the grating. The maximum value of $\Delta n$ is $|n_e - n_g|$ or $|n_o - n_g|$. From the formula (13), when $\Delta n=0$, that is, when the extraordinary refraction index $n_o$ of the liquid crystal is equal to the refraction index ng of the transparent resin, $\eta o=1$ and all portions of the incident light are emitted as the 0-order transmission diffraction light. When $\Delta n \cdot T = m \cdot \lambda o$ (m=1, 2, 3, ...), $\eta o=0$ and the 0-order transmission diffraction light is not emitted and all portions of the incident light are emitted as the high order diffraction light.

In the embodiments of FIGS. 20 and 21, the liquid crystal is the positive dielectric nematic liquid crystal RO-TN200 (Rosche) having $n_e=1.81$ and $n_o=1.53$ for the wavelength of 633 nm, and the light source is the He-Ne laser (λ=633 nm). The refraction index of the transparent resin is 1.53, and the refraction index $n_g$ of the transparent resin for the wavelength of 633 nm is equal to the refraction index of the liquid crystal under the application of the electric field, that is, the ordinary refraction index $n_o$. Thus, from the equation (13), $\eta_o=1$. When no electric field is applied, $\eta_o=0$ as seen from the formula (13) in which $\Delta n = |n_e - n_g|$ is placed. Thus, the high order diffraction light is emitted and the ±1-order diffraction light which is close to the 0-order light direction makes an exit angle of 1.98° in the air relative to the 0-order light direction.

Figure 20F:
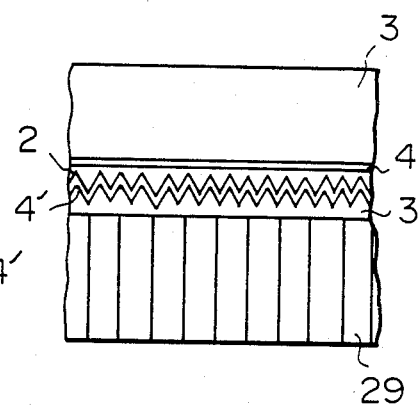

In the liquid crystal light modulation device shown in FIG. 20F, the aperture number of the light wave guide or fiber plate is 0.3 and the acceptable half-angle in the air is 17.5°. Therefore, all high order diffraction lights other than the 0-order light are shut off by the fiber plate.

On the other hand, the light roover used in the liquid crystal light modulation device of FIG. 21C has an aperture diameter $\gamma = 0.5$ mm and a thickness $d = 3$ mm. Accordingly, the acceptable half-angle is $\theta_{min} = 14.3°$ and all high order diffraction lights other than the 0-order light are absorbed by the light absorber of the light roover.

The liquid crystal light modulation devices shown in FIGS. 20C and 21C were incorporated in a measuring instrument shown in FIG. 22 and a rectangular voltage having a frequency of 1 KHz and an effective voltage of 15 V was applied. The rise time response of both devices was 0.5 msec, the fall time response was 2 msec, the contrast ratio was more than 100, and the light flux utilization efficiency of the 0-order transmission light was more than 80%.

Figure 23:
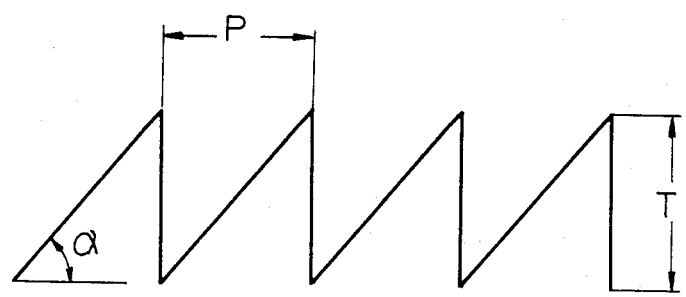
FIG. 23 shows another brazed diffraction grating used in the liquid crystal light modulation device.

FIG. 23 shows a modification of the diffraction grating used in the present liquid crystal light modulation device. P indicates the pitch of the grooves of the grating, $\alpha$ indicates an inclination angle and T indicates the height of the grating. It is a brazed diffraction grating shown in FIG. 9 in which $A = 5.0$ μm, $\alpha = 66°$ and $T = 11.2$ μm.

The brazed diffraction grating was used in the device shown in FIG. 20 and formed in the same manner as that in the previous embodiment and a similar measurement was done while using an LED light source having a wavelength of 800 nm. In the static state, little 0-order transmission light was emitted and all diffraction lights were 3-order diffraction lights, and the exit angle in the air was 28.7° relative to the 0-order light direction. Under the application of the electric field, the refraction index of the grating material or transparent resin was equal to the ordinary refraction index of the liquid crystal and all emitted lights were 0-order diffraction lights. The fiber plate used in the present embodiment had an aperture number of 0.35 (acceptable half-angle 20.5°). Thus, all 3-order lights were shut off and no stray light reached the photosensor in the static state. The measurement result was essentially the same as that in the previous embodiment. A light flux was applied to the present liquid crystal light modulation device through the liquid crystal plane at an incident angle of 28.7° in the air. Only the 3-order diffraction light was emitted and the 0-order diffraction light was shut off. The measurement result when a 3-order diffraction light was used as a modulation light was similar to those in the previous two embodiments.

The above brazed diffraction grating was applied to the liquid crystal light modulation device having the light shut-off means of the light absorber as shown in FIG. 21. Formation of this liquid crystal light modulation device and measurement result are described.

The liquid crystal light modulation device having the brazed diffraction grating shown in FIG. 23 was formed in the following manner. The diffraction grating was formed on a transparent glass substrate of $50 \times 25 \times 1$ mm³ in the same manner as that in the previous embodiment and an ITO film was vapor deposited on the diffraction grating area and other area. An ITO film was also formed on a predetermined area of another transparent glass substrate. The two substrates were bonded together with the electrodes facing each other and a liquid crystal was filled therebetween. Then, plastic pipes each having a thickness of 0.1 mm, a diameter of 0.5 mm and a length of 1.5 mm, and having a black diffusion inner surface, were bound to form a honeycomb-shaped plate, and the bind was contacted to the exit glass substrate by transparent bonding material.

In the brazed diffraction grating shown in FIG. 23, the exit diffraction lights may be controlled to include only the 0-order diffraction light and a predetermined high order diffraction light. As the electric field is turned on and off, the energy is transferred between the two diffraction lights. In the present embodiment, the incident light was applied normal to the substrate through the transparent resin diffraction grating, and the measurement was done only for the 0-order light in the same manner as that in the previous embodiment. An LED having a center wavelength of 800 nm was used as a light source. The refraction indices of the elements and the liquid crystal at the wavelength of 800 nm were essentially the same as those in the previous embodiment.

In the present embodiment, no 0-order transmission light was emitted in the static state and all diffraction lights were 3-order diffraction lights. The exit angle in the air was 28.7° relative to the 0-order light direction. Under the application of the electric field, the refraction index of the grating material or the transparent resin was equal to the ordinary refraction index of the liquid crystal and all exit lights were 0-order diffraction lights.

The honeycomb-shaped plate used in the present embodiment had $d = 1.5$ mm, $\gamma = 0.5$ mm and a maximum acceptable half-angle of 18.4°. Accordingly, all 3-order lights were shut off and no stray light reached the photosensor in the static state. The measurement result was essentially the same as that in the previous embodiment. A light flux was applied to the present light modulation device through the liquid crystal plane at an incident angle of 28.7° in the air. Only the 3-order diffraction lights were emitted and all 0-order diffraction lights were shut off. The measurement result when the 3-order diffraction light was used as a modulation light was similar to those in the previous three embodiments.

As described above, by the provision of the light shut-off means having the light wave guide, light absorber or light scatterer on the exit side of the light flux, the liquid crystal light modulation device having an improved contrast ratio (S/N ratio) is provided. In the present embodiment, the light modulation device and the light shut-off means are integral although it is not essential. When they are integral, they can be produced as one component and hence the integral component is very useful for the liquid crystal light modulation device.

Another application of the present liquid crystal light modulation device is explained. FIG. 24 shows an other application of the present liquid crystal modulation device. Numeral 61 denotes a reflection light. Like numerals to those in the previous embodiments denote like elements. Only a main portion of the device is shown to simplify the explanation. In the present liquid crystal light modulation device, layers of the transparent insulator 1 are formed on the opposing transparent electrodes 4 formed on the pair of transparent substrates, a diffraction grating structure is formed in one of the transparent insulators and the liquid crystal 2 is filled.

Figure 24A:
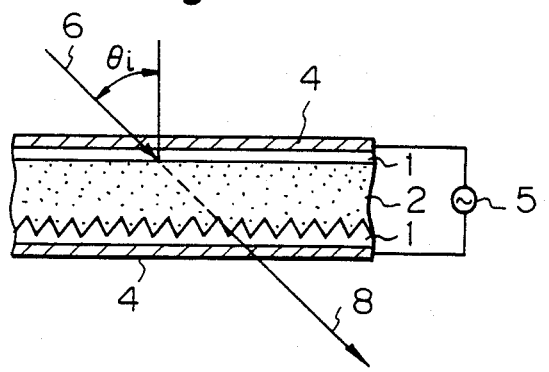
FIGS. 24A-24C show other usage of the liquid crystal light modulation device.
Figure 24B:
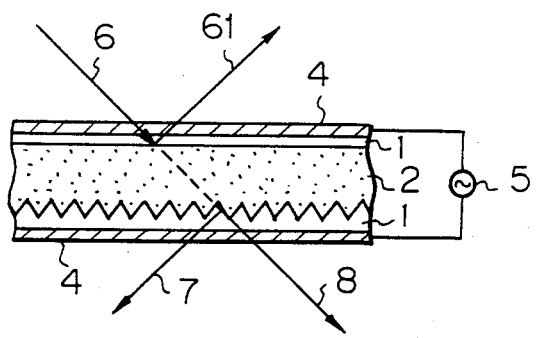
Figure 24C:
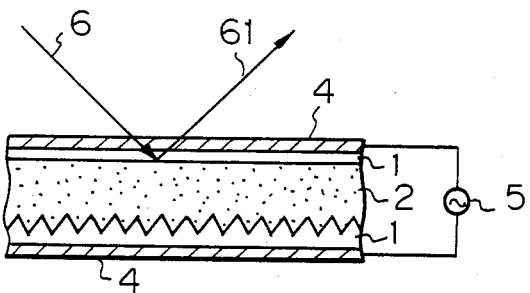

When a light flux polarized in the direction of the grooves of the diffraction grating (normal to the plane of the drawing) is applied at a predetermined incident angle, the polarization direction of the incident light 6 coincides with the orientation direction of the liquid crystal 2 in the static state, and the effective refraction index of the liquid crystal 2 to the incident light 6 is the ordinary refraction index $n_e$. If the refraction index $n_t$ of the transparent electrode 4, the refraction index $n_g$ of the transparent insulator 1 and the extraordinary refractive index $n_e$ of the liquid crystal 2 are equal, all portions of the incident light 6 are emitted as the transmission light 8 as shown in FIG. 24A. When an electric field is applied across the transparent electrodes, the liquid 2 is oriented in the direction of the electric field. The refraction index of the liquid crystal 2 varies between the extraordinary refraction index $n_e$ and the ordinary refraction index $n_o$, and the incident light 6 is divided into the reflection light 61, transmission light 8 and high order diffraction light as shown in FIG. 24B. Finally, when the applied electric field reaches a predetermined level, the liquid crystal 2 is oriented in the direction of the electric field, that is, normal to the electrode plane, and the refraction index of the liquid crystal 2 to the incident light 6 is the ordinary refraction index $n_o$. If the incident light 6 is applied at the incident angle $\theta_i$ and a condition shown by a formula (15) is met, the incident light 6 is totally reflected by the interface between the liquid crystal 2 and the transparent insulator 1 to produce the reflection light 61 as shown in FIG. 24C.

$$\sin \theta_i > n_o/n_g \quad (15)$$

Figure 25:
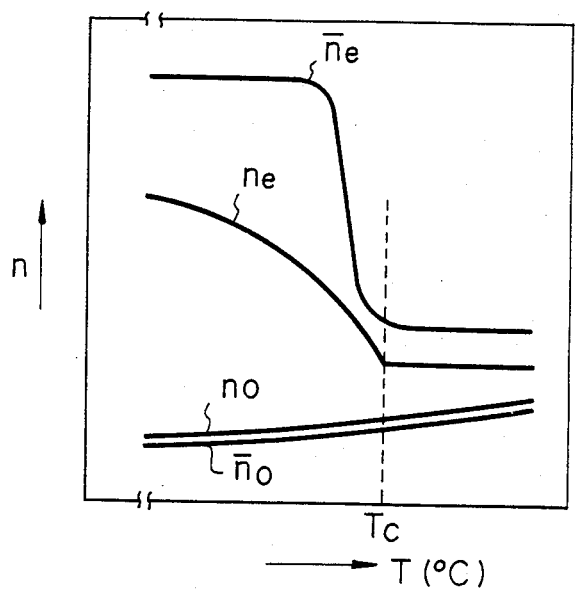
FIG. 25 shows temperature characteristics of a refraction index of the liquid crystal oriented by the diffraction grating of the liquid crystal light modulation device and a refraction index of a liquid crystal oriented by a conventional orientation method, for an ordinary refraction index and an extraordinary refraction index.

The method for orienting the liquid crystal by the diffraction grating having the fine grooves can improve the refraction index difference $\Delta n$ of the liquid crystal and the temperature stability compared with the conventional rubbing process or oblique vapor deposition of SiO or $MgF_2$. FIG. 25 shows temperature characteristics of the refraction indices $\overline{n}_e$ and $\overline{n}_o$ of the liquid crystal oriented by the diffraction grating and the refraction indices $n_e$ and $n_o$ of the liquid crystal oriented by the conventional method. An abscissa represents the temperature T and an ordinate represents the refraction index n. As seen from FIG. 25, the ordinary refraction indices $\overline{n}_o$ and $n_o$ change little but the extraordinary refraction index $n_e$ changes more than $n_e$, and the temperature stability is excellent.

Figure 26:
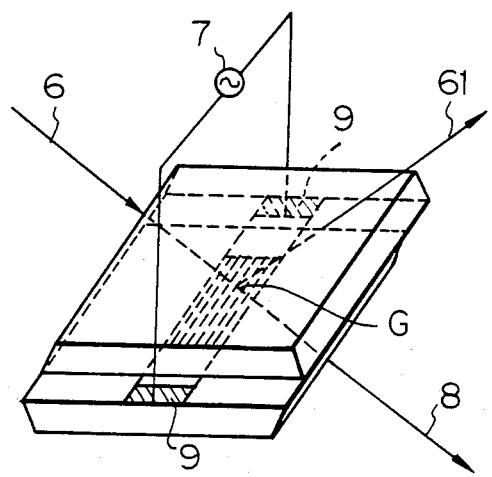
FIG. 26 illustrates formation of the liquid crystal light modulation device having the function shown in FIG. 24, FIGS. 27A and 27B show a light switching array in accordance with the liquid crystal light modulation device of the present invention.

Formation of the present liquid crystal light modulation device and evaluation of performance of the device are described. FIG. 26 shows a perspective view of the liquid crystal light modulation device. Like numerals to those in FIG. 24 denote like elements. G denotes a diffraction grating area.

A SF4 glass (Kohara Optical Glass Seisakusho, refraction index of 1.75 for wavelength of 6328 Å) was cut into a hexahedron as shown in FIG. 26, the bottom surface and both side surfaces were polished to a flatness of within several Newton rings and it was ultrasonic-washed by methanol, triquerene, acetone and pure water. Then, it was dried by nitrogen gas, baked in nitrogen at 120° C. for 20 minutes, and an ITO film was formed on the bottom surface of the hexahedron in a vacuum device to a thickness of 1000 Å by the ion plating method. The ITO film showed a sheet resistance of 18 Ω/sq and a refraction index of 1.80 for the light having the wavelength of 6328 Å. $MgF_2$ films were formed to a thickness of 1146 Å on both sides by the electron beam vapor deposition method, and a He-Ne laser beam was applied normally to the $MgF_2$ film. Little reflection occurred. Then, Microposit 1350 (Shipley, positive resist) was spinner-coated on the ITO film, and prebaked at 90° C. for 20 minutes to form a resist film of 4000 Å. Then, a He-Cd laser beam ($\lambda$=3250 Å) was interference-exposed to the resist film at an angle of 38° so that the diffraction grating of the resist having a pitch of 0.5 μm was formed at the center of the electrode. Then, the ITO film was etched in grating shape to a thickness of 200 Å in a vacuum chamber by the ion milling method using Ar gas, the Microposit 1350 was dissolved in acetone and the ITO film electrode having the shallow diffraction grating only in the He-Cd laser beam incident area was applied to the bottom surface of the glass hexahedron.

Two such glass hexahedrons were prepared and the diffraction grating electrode surfaces were arranged to face each other with the direction of the grooves of the diffraction gratings being aligned to each other, and a positive dielectric liquid crystal RO-TN701 (Rosche) was filled therebetween. The spacing was set to 5 μm by Mylar spacers. A nominal refraction index of the liquid crystal RO-TN701 is an ordinary refraction index $n_o$=1.498 and extraordinary refraction index $n_e$=1.648. The liquid crystal oriented by the diffraction grating showed $n_o$=1.49 and $n_e$=1.75. Accordingly, the refraction index difference $\Delta n$ ($= n_e - n_o$) is improved and the temperature stability is excellent.

Lead wires were bonded to the device thus formed and connected to the power supply to complete the liquid crystal light modulation device shown in FIG. 26. A He-Ne laser beam polarized in the direction of the grooves of the diffraction grating was applied to the liquid crystal light modulation device at an incident angle of 60°. In the static state, the incident light 4 passed through the device as it was and appeared as the transmission light 8. The ratio of the transmission light 8 to the incident light 6 was more than 90%. When an A.C. electric field of 10 Vp-p and 1 KHz was applied, the incident light 6 was totally reflected and became the reflection light 61. The ratio of the reflection light 61 to the incident light 6 was also more than 90%.

In order to measure the switching response time, a 10 V step voltage was applied and a time to reach 90% of an output saturation value was measured. It was 1.0 msec. The voltage was cut off and a fall time was masured. It was 1.5 msec.

Figure 27A:
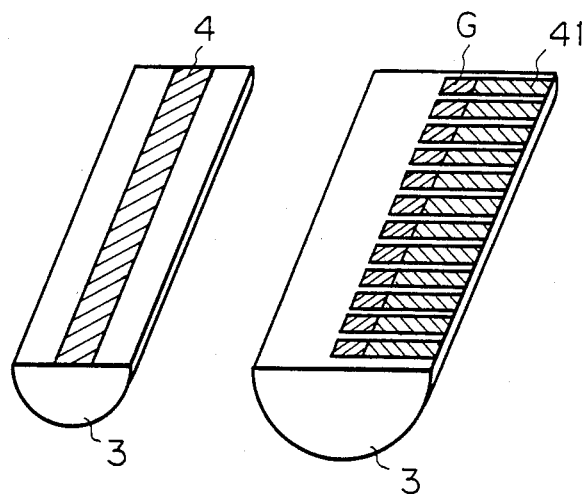
Figure 27B:
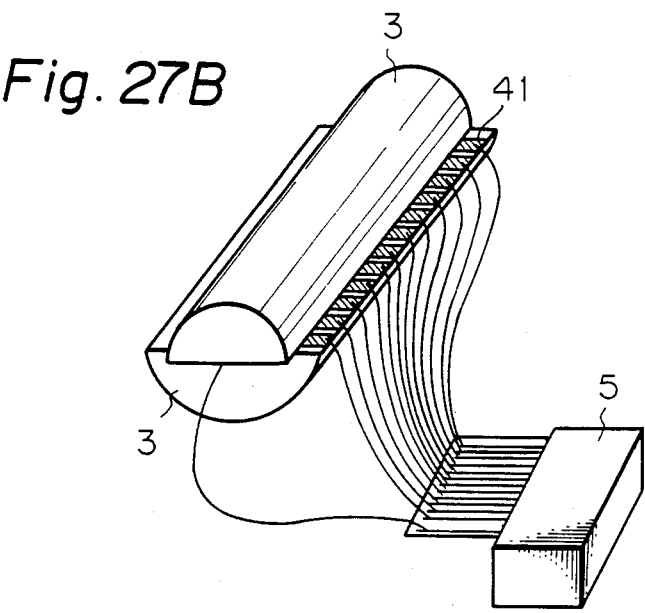

FIG. 27 shows a light switching array which is an application of the present liquid crystal light modulation device. Numeral 41 denotes a web-shaped electrode. Formation of the light switching array shown in FIG. 27 is explained. A SF6 Glass (Kahara Optical Glass Seisakusho, refraction index of 1.80 for wavelength of 6328 Å) was formed into two semi-cylinders, which were polished and washed in the same manner as that in the previous embodiment. Web-shaped ITO film pattern as shown in FIG. 27A was formed on the flat surface of one of the glass semi-cylinders by the ion plating method, and a planar ITO film was formed on the other semi-cylinder. Me spacing of the web-shaped ITO film electrodes 4 was 50 μm, the refraction index of the ITO films 4 and 41 was 1.80 and the sheet resistance was 18 Ω/sq. $MgF_2$ films were formed to a thickness of 1146 Å on the back surfaces of the two semi-cylindrical glasses by the electron beam vapor deposition method.

A white light was applied normal to the MgF$_2$ film and little reflection occurred on the surface.

The diffraction grating was formed on the ITO film electrode as shown in FIG. 27A in the same manner as that in the previous embodiment. The semi-cylindrical glasses were arranged to face each other with the diffraction grating areas G being opposed to each other and center axes G being aligned to each other, and a positive dielectric liquid crystal ZLI 1285 (Merck) was filled therebetween. The thickness of the liquid crystal was set to 5 μm by Mylar spacers. Finally, lead wires were bonded to the web-shaped electrode 41 and the opposing electrode 4 and connected to the power supply 5 to complete the light switching array shown in FIG. 27B. A halogen lamp light was shaped to a sheet beam by a cylindrical lens and the sheet beam was applied to the present switching array. Resolution power, output light intensity, contrast ratio and response time obtained in the measurement were sufficient enough to allow the switching array to be applied to a printer.

FIG. 28 shows an other application of the present liquid crystal light modulation device, which application has a light switching function.

Figure 28A:
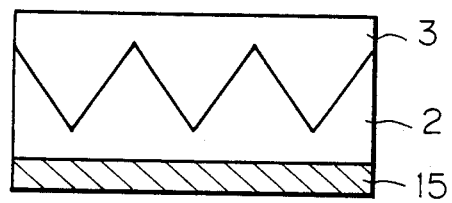
FIGS. 28A and 28B shows a modulation device having a light switching function in accordance with the liquid crystal light modulation device of the present invention.
Figure 28B:
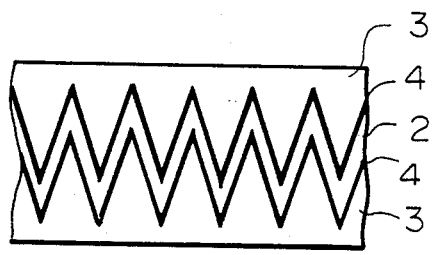

In the liquid crystal light modulation device shown in FIG. 28A, three triangles are formed in one transparent substrate 3 and a liquid crystal 2 whose orientation can be controlled by heat is filled between the inclined surfaces of the transparent substrate 3 and the heater 15. In the liquid crystal light modulation device shown in FIG. 28B, the inclined surfaces of both substrates 3 are finer. Both substrates 3 have a plurality of triangular structures and the transparent electrodes 4 are vapor deposited thereon, and the liquid crystal 2 is filled therebetween. The inclination angle of the triangles is appropriately determined taking a condition of total reflection derived from a Snell's law into consideration.

Figure 29A:
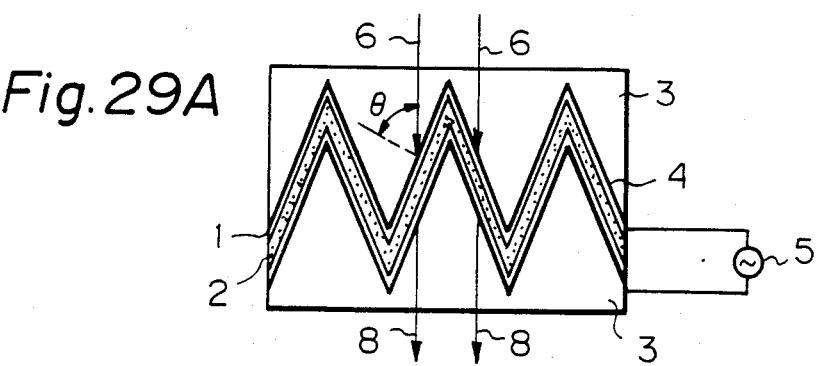
FIGS. 29A and 29B show an electric field controlled liquid crystal light modulation device constructed as shown in FIG. 28B and its function.

FIG. 29 shows an electric field controlled liquid crystal light modulation device and its function. A basic construction is similar to that of the device of FIG. 28B, but the transparent insulator 1 is further formed on the transparent electrode 4, and the liquid crystal 2 having a positive dielectricity is used. The transparent electrode 4 may be made of ITO, SnO$_2$ or In$_2$O$_3$, the transparent insulator 1 may be made of glass, SiO$_2$, SiO, MgF$_2$, Al$_2$O$_3$ or TiO$_2$, and the transparent substrate 3 may be made of optical glass or optical plastic.

Those materials for the transparent electrode, transparent insulator and transparent substrate are also applicable to the previous embodiments.

The function of the light switch of the present liquid crystal light modulation device shown in FIG. 29 is explained. Numeral 6 denotes an incident light, numeral 7 denotes a reflection light, numeral 8 denotes a transmission light and numeral 5 denotes a power supply. A sawtooth surface shown in FIG. 29 is processed by rubbing process or oblique vapor deposition so that the liquid crystal 2 is strongly oriented in the direction of the grooves.

Figure 29B:
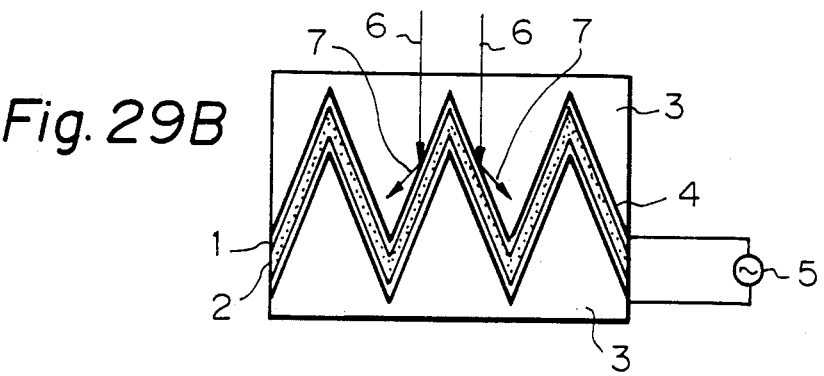

When a light flux polarized in the direction of the grooves of the sawtooth surface (normal to the plane of the drawing) is applied normal to the liquid crystal light modulation device, the polarization direction of the incident light 6 coincides with the orientation direction of the liquid crystal 2, that is, the direction of the grooves of the sawtooth surface in the static state, and the effective refraction index of the liquid crystal 2 to the incident light 6 is the extraordinary refraction index $n_e$. If the refraction indices of the transparent substrate 3, transparent electrode 4 and transparent insulator 1 are equal to the extraordinary refraction index $n_e$ of the liquid crystal 2, all portions of the incident light 6 are emitted as the transmission light 8. When the electric field is applied across the transparent electrodes 4, the liquid crystal 2 is oriented toward the direction of the electric field, and when the electric field reaches a predetermined level, the liquid crystal 2 is oriented in the direction of the electric field (parallel to the incident plane), and the effective refraction index of the liquid crystal 2 to the incident light 6 shows the ordinary refraction index $n_o$. The incident light 6 is applied to the liquid crystal 2 at an angle equal to the inclination angle θ of the inclined surfaces. If a formula (16) is satisfied, the incident light 6 is totally reflected by the interface between the transparent insulator 1 and the liquid crystal 2 as shown in FIG. 29B, and it becomes the reflection light 7.

$$\sin \theta > n_o/n_g \tag{16}$$

The refraction indices of the transparent insulator 1, transparent electrode 4 and transparent substrate 3 are equal to $n_g$. If the thickness of the transparent electrode 4 and transparent insulator 1 are sufficiently smaller than the wavelength of the incident light 6, the refraction indices of the transparent electrode 4 and transparent insulator 1 may be neglected. In this case, conditions for total transmission and total reflection are primarily determined by the refraction indices of the transparent substrate 3 and the liquid crystal 2 and the inclination angle of the inclined surfaces. By controlling the application of the electric field, the transmission light intensity can be controlled. Anti-reflection film is preferably formed on incident and exit surfaces of the transparent substrate 3 in order to improve the light utilization efficiency and prevent a ghost light.

Figure 30:
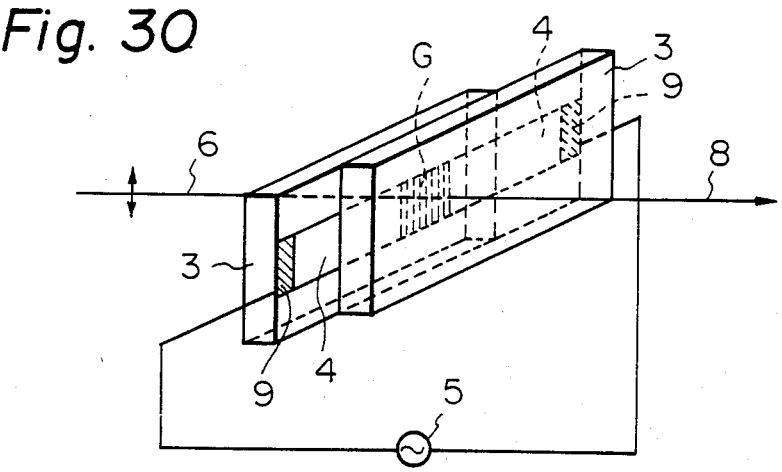
FIG. 30 illustrates formation of the liquid crystal light modulation device shown in FIG. 29.

Formation of the liquid crystal light modulation device shown in FIG. 29 and evaluation of its performance are described. FIG. 30 shows a perspective view of the liquid crystal light modulation device.

Both sides of LaSFO$_3$ glass (Kohara Optical Glass Seisakusho, 20×30×2 mm$^3$, refraction index of 1.80 for λ=6328 Å) were polished to flatness of within several Newton rings, ultrasonic-washed by methanol, triquelene, acetone and pure water, dried in nitrogen gas and baked in nitrogen at 120° C. for 20 minutes. A sawtooth surface having an apex angle of 60° and a pitch of 0.5 mm was formed on a light incident area (10×10 mm$^2$) on one of the surfaces by the ruling machine, and an ITO film was formed to a thickness of 2000 Å by the ion plating method. The ITO film had a sheet resistance of 16 Ω/sq and a refraction index of 1.80 to the light having a wavelength of 6328 Å. The ITO film was etched into an electrode structure, and an Al$_1$O$_3$ film was obliquely vapor deposited to a depth of 1000 Å by the electron beam vapor deposition method except for the electrode take-out area to insulate it from the opposing electrode and orient the liquid crystal. An Al electrode having a thickness of 5000 Å was formed on the electrode take-out area and an anti-reflection MgF$_2$ film was formed to a thickness of 1146 Å on the back side of the transparent substrate. Then, another substrate having a similar sawtooth surface was prepared by LaSFO$_3$ glass. In order to mesh the two substrates as shown in FIG. 29, the sawtooth surface of one substrate was concave and the sawtooth surface on the other substrate was convex. A SiO$_2$ film having a thickness of 7 μm, which served as a spacer, was formed around the sawtooth surface of one substrate.

The two substrates were arranged to face each other with the sawtooth surface areas G being opposed to each other, and the liquid crystal was filled therebetween and sealed. The liquid crystal used was a positive dielectric liquid crystal RO-TN200 (Rosche, $n_o = 1.53$ and $n_e = 1.80$ for $\lambda = 6328$ Å). Finally, lead wires were bonded to the electrodes 4 and connected to the power supply 5 to complete the liquid crystal light modulation device shown in FIG. 30.

A He-Ne laser beam ($\lambda = 6328$ Å) polarized in the direction of the grooves of the sawtooth surfaces was applied normal to the substrate 3 of the liquid crystal light modulation device. In the static state, the incident light 6 passes through the present device as it was and separated as the transmission light 8. The ratio of the transmission light to the incident light was more than 95%. When a rectangular AC electric field of 10 Vp-p and 1 KHz was applied, the incident light 6 was totally reflected and the ratio of the transmission light to the incident light was less than 0.5%. The light source is not limited to the laser but it may be LED, halogen lamp or fluorescent lamp.

As described hereinabove, in the liquid crystal light modulation device of the present invention, the liquid crystal is orderly oriented to a predetermined orientation by the diffraction grating having fine and orderly arranged grooves, and the orientation of the liquid crystal oriented by the diffraction grating is changed by an electric field, heat or magnetic field to attain various light modulations. According to the orientation method of the present invention, the characteristic of the liquid crystal is improved compared with the conventional orientation method. The degree of orderly orientation of the liquid crystal is improved and the difference $\Delta n$ between the extraordinary refraction index and the ordinary refraction index is improved, and the response speed when the orientation is controlled by the electric field is improved.

Since the present liquid crystal light modulation device does not need a polarization plate, the light utilization efficiency is improved. A view field angle characteristic in a display device is improved compared with the TN cell. The construction is simple and the contrast ratio is very high.

As shown in the above embodiments, various functions can be attained by changing the shape and dimension of the diffraction grating. Either the reflection type or the transmission type may be used and the light to be used may range from monochromatic light to white light depending on the applications.

The above embodiments merely show preferred embodiments of the liquid crystal light modulation device of the present invention and they may be modified in their functions and constructions depending on the applications.

I claim:

1. A liquid crystal liquid modulation device comprising:

a first substrate and a second substrate; said first substrate having a light-incident side for receiving incident light and a facing side facing said second substrate, said second substrate having a facing side facing said facing side of said first substrate, and said facing sides of said first and second substrates being parallel with each other and spaced a predetermined distance from each other;

an optical element having plural portions, and liquid crystals, said portions of said optical element and said liquid crystals being alternately arranged between said first and second substrates, the heights of said portions of said optical element and said liquid crystals in a direction normal to said facing sides being substantially the same, and said liquid crystals being separated from one another by the intervening portions of said optical element; and control means for changing the refractive index of said liquid crystals, said control means causing said liquid crystals selectively to have at least two refractive indexes, one of said refractive indexes being substantially the same as that of said optical element and the other of said refractive indexes being different from that of said optical element so as to form a diffraction grating by said alternatively arranged liquid crystals and portions of said optical element.

2. A liquid crystal light modulation device according to claim 1 wherein said diffraction grating is a rectangular diffraction grating.

3. A liquid crystal light modulation device according to claim 1 wherein said diffraction grating is a triangular or brazed diffraction grating.

4. A liquid crystal light modulation device according to claim 1 wherein said diffraction grating is a sinusoidal diffraction grating.

5. A liquid crystal light modulation device according to claim 1 wherein said diffraction grating is an asymmetric diffraction grating.

6. A liquid crystal light modulation device according to claim 1, wherein said control means includes two electrodes arranged to sandwich the liquid crystals to control the orientation of the liquid crystals by an electric field generated by said two electrodes.

7. A liquid crystal liquid modulation device according to claim 6 wherein said liquid crystals are nematic liquid crystals having a positive dielectricity.

8. A liquid crystal liquid modulation device according to claim 1 wherein said liquid crystals are ferrodielectric liquid crystals.

9. A liquid crystal light modulation device according to claim 1 wherein said control means includes at least one heater to control the orientation of the liquid crystals by heat.

10. A liquid crystal light modulation device according to claim 1 wherein said optical element is made of a transparent insulator.

11. A liquid crystal light modulation device according to claim 1 wherein said optical element includes a transparent electrode.

12. A liquid crystal light modulation device according to claim 1 wherein each of said portions of said optical element has a reflection surface.

13. A liquid crystal light modulation device according to claim 1 wherein said control means changes the orientation of said liquid crystals; and a height T ($\mu$m) and a pitch P ($\mu$m) of said diffraction grating and a difference $\Delta n$ between an extraordinary refraction index $n_e$ and an ordinary refraction index $n_o$ of the liquid crystal satisfies the following conditions for a wavelength between 350 nm and 800 nm:

$0.2 \leq \Delta n \cdot T \leq 7.0$, and $0.8 \leq P \leq 10$.

14. A liquid crystal light modulation device according to claim 13 wherein said control means includes two transparent electrodes arranged to sandwich said liquid crystals to control the orientation of said liquid crystals by an electric field generated by said two transparent electrodes.

15. A liquid crystal light modulation device according to claim 14 wherein said diffraction grating is rectangular and essentially satisfies the following condition:

$$0.2 \leq \Delta n \cdot T \leq 1.0$$

16. A liquid crystal light modulation device according to claim 14 wherein said diffraction grating is triangular and essentially satisfies the following condition:

$$1.3 \leq \Delta n \cdot T \leq 7.0$$

17. A liquid crystal light modulation device according to claim 1 wherein said diffraction grating has a plurality of inclined surfaces arranged at a predetermined pitch, at least 50% of a total projection area formed when said diffraction grating is projected onto said substrate being occupied by projection areas of said plurality of inclined surfaces.

18. A liquid crystal liquid modulation device according to claim 13 wherein said liquid crystals are nematic liquid crystals having a positive dielectricity.

19. A liquid crystal light modulation device according to claim 1, wherein said seconds substrate has a light exit side, and further comprising light shut-off means for transmitting therethrough a diffraction signal light diffracted by said diffraction grating and having an incident angle lower than a selected $\theta$ min an for shutting-off transmission of a diffraction non-signal light having an incident angle larger than $\theta$ min, said light shut-off means being arranged proximate to or in contact with said light-exit side of said second substrate.

20. A liquid crystal light modulation device according to claim 19 wherein said control means includes a pair of transparent electrodes arranged to sandwich said liquid crystals.

21. A liquid crystal light modulation device according to claim 20 wherein said light shut-off means includes a plurality of light wave guides having longitudinal direction thereof arranged along a direction of emission of the signal light.

22. A liquid crystal light modulation device according to claim 20 wherein said light shut-off means includes a plurality of alternately arranged light transmission members and light absorption members.

23. A liquid crystal light modulation device according to claim 20 wherein said light shut-off means includes a plurality of alternately arranged light transmission members and light scatter members.

24. A liquid crystal liquid modulation device according to claim 1, wherein said optical element is formed as part of said substrate.

25. A liquid crystal liquid modulation device according to claim 1, wherein said diffraction grating is a pedestal-shaped diffraction grating.

26. A liquid crystal liquid modulation device according to claim 1 wherein said control means includes electrode films formed on said facing sides of said first and second substrates, whereby the refractive index of said liquid crystals is changed by generating an electric field between said electrode films.

27. A liquid crystal liquid modulation device according to claim 26 wherein liquid crystal molecules of said liquid crystals are arranged in a direction parallel to said facing side in the absence of said electric field.

28. A liquid crystal light modulation device according to claim 1 wherein said device is adapted to receive an incident light entering obliquely relative to said first substrate and said control means changes the orientation of said liquid crystals so as to switch said incident light selectively to a 0-order light and a high order diffracted light.

29. A liquid crystal liquid modulation device comprising:
   a first substrate and a second substrate; said first substrate having a light-incident side for receiving incident light and a facing side facing said second substrate, said second substrate having a facing side facing said facing side of said first substrate, and said facing sides of said first and second substrateas being parallel with each other and spaced a predetermined distance from each other;
   a diffraction grating having plural portions and liquid crystals, said portions of said diffraction grating and said liquid crystals being alternately arranged between said first and second substrates, the heights of said portions of said diffraction grating and said liquid crystals in a direction normal to said facing sides being substantially the same, and said liquid crystals being separated from one another by the intervening portions of said diffraction grating; and
   control means for controlling an orientation of said liquid crystals.

30. A liquid crystal light modulation device according to claim 29 wherein liquid crystal molecules of said liquid crystals are arranged in a predetermined direction.

31. A liquid crystal light modulation device according to claim 30 wherein the liquid crystal molecules are arranged in said predetermined direction in accordance with fine grooves formed by said portions of the diffraction grating.

32. A liquid crystal light modulation device according to claim 29 wherein a section of said portions of the diffraction grating is of a pedestal shape.

33. A liquid crystal light modulation device according to claim 32 wherein said device is adapted to receive an incident light entering obliquely relative to said first substrate and said control means changes the orientation of said liquid crystals so as to switch said incident light selectively to a 0-order light and a high order diffracted light.

34. A liquid crystal light modulation device according to claim 29, wherein said second substrate has a light-exit side, and further comprising light shut-off means for transmitting therethrough a diffraction signal light diffracted by the diffraction grating and having an incident angle lower than a selected $\theta$ min and for shutting-off transmission of a diffraction non-signal light having an incident angle larger than $\theta$ said light shut-off means being arranged proximate to or in contact with said light-exit side of said second substrate.

35. A liquid crystal light modulation device according to claim 29 wherein said control means includes electrode films formed on said facing sides of said first and second substrates, whereby the orientation of said liquid crystals is changed by generating an electric field between said electrode films.

36. A liquid crystal light modulation device according to claim 29 wherein said control means causes said liquid crystals selectively to have at least two refractive indexes, one of said refractive indexes being substantially the same as that of said diffraction grating.

* * * * *

UNITED STATES PATENT AND TRADEMARK OFFICE
CERTIFICATE OF CORRECTION

PATENT NO. : 4,729,640
DATED : March 8, 1988
INVENTOR(S) : HAJIME SAKATA

It is certified that error appears in the above-identified patent and that said Letters Patent is hereby corrected as shown below:

COLUMN 10

Line 43, "$(n_g=n_o) \cdot T=\lambda_o/2 \quad (11)$" should read
--$(n_g-n_o) \cdot T=\lambda_o/2 \quad (11)$--.

COLUMN 12

Line 44, "$(n_e=n_g) \cdot T=\lambda_o \quad (1')$" should read
--$(n_e-n_g) \cdot T=\lambda_o \quad (1')$--.

COLUMN 15

Line 51, "acryrostylene" should read --(acrylonitrile--.
Line 52, "to nitrile butadiene-styrene-stylene polymer)" should read --butadiene-styrene polymer)--.

COLUMN 20

Line 66, "$\Delta n=|ne-ng|$" should read --$\Delta n=|n_e-n_g|$--.

COLUMN 27

Line 59, "liquid modulation" should read --light modulation--.

COLUMN 28

Line 37, "liquid modulation" should read --light modulation--.
Line 40, "liquid modulation" should read --light modulation--.

UNITED STATES PATENT AND TRADEMARK OFFICE
CERTIFICATE OF CORRECTION

PATENT NO. : 4,729,640

DATED : March 8, 1988

INVENTOR(S) : HAJIME SAKATA

It is certified that error appears in the above-identified patent and that said Letters Patent is hereby corrected as shown below:

COLUMN 29

Line 25, "liquid modulation" should read --light modulation--.
Line 29, "seconds" should read --second--.
Line 33, "an" should read --and--.
Line 55, "liquid modulation" should read --light modulation--.
Line 58, "liquid modulation" should read --light modulation--.
Line 61, "liquid modulation" should read --light modulation--.
Line 67, "liquid modulation" should read --light modulation--.

UNITED STATES PATENT AND TRADEMARK OFFICE
CERTIFICATE OF CORRECTION

PATENT NO. : 4,729,640

DATED : March 8, 1988

INVENTOR(S) : HAJIME SAKATA

It is certified that error appears in the above-identified patent and that said Letters Patent is hereby corrected as shown below:

COLUMN 30

Line 9, "liquid modulation" should read --light modulation--.
Line 16, "substrateas" should read --substrates--.
Line 31, "liquid" should read --the liquid--.
Line 54, "than $\theta$" should read --than $\theta$ min--.

Signed and Sealed this

Twenty-third Day of August, 1988

Attest:

DONALD J. QUIGG

*Attesting Officer*    *Commissioner of Patents and Trademarks*